(12) United States Patent
Liu et al.

(10) Patent No.: US 11,956,803 B2
(45) Date of Patent: Apr. 9, 2024

(54) METHOD AND APPARATUS FOR DETERMINING TRANSMISSION RESOURCE

(71) Applicant: HUAWEI TECHNOLOGIES CO., LTD., Shenzhen (CN)

(72) Inventors: Fengwei Liu, Chengdu (CN); Jing Qiu, Chengdu (CN); Lei Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 324 days.

(21) Appl. No.: 17/487,440

(22) Filed: Sep. 28, 2021

(65) Prior Publication Data

US 2022/0015095 A1 Jan. 13, 2022

Related U.S. Application Data

(63) Continuation of application No. PCT/CN2020/075401, filed on Feb. 14, 2020.

(30) Foreign Application Priority Data

Mar. 29, 2019 (CN) .......................... 201910253084.2
Apr. 3, 2019 (CN) .......................... 201910266905.6

(51) Int. Cl.
*H04W 72/27* (2023.01)
*H04W 16/28* (2009.01)
*H04W 72/044* (2023.01)
*H04W 72/0446* (2023.01)

(52) U.S. Cl.
CPC .......... *H04W 72/27* (2023.01); *H04W 16/28* (2013.01); *H04W 72/0446* (2013.01); *H04W 72/046* (2013.01)

(58) Field of Classification Search
CPC ............ H04W 16/28; H04W 72/0446; H04W 72/046; H04W 72/27
See application file for complete search history.

(56) References Cited

FOREIGN PATENT DOCUMENTS

| CN | 101990231 A | 3/2011 |
|----|-------------|--------|
| CN | 102036293 A | 4/2011 |
| CN | 102227934 A | 10/2011 |
| CN | 106304112 A | 1/2017 |
| CN | 107567068 A | 1/2018 |
| CN | 108811097 A | 11/2018 |
| WO | 2014204425 A1 | 12/2014 |

(Continued)

OTHER PUBLICATIONS

Samsung, Necessary Enhancements for NR IAB. 3GPP TSG RAN WG1 Meeting #95, Spokane, USA, Nov. 12, 16, 2018, R1-1812981, 9 pages.

(Continued)

*Primary Examiner* — Brian P Cox
(74) *Attorney, Agent, or Firm* — Rimon PC

(57) ABSTRACT

This application provides a method and apparatus for determining a resource in a relay system. By receiving resource indication information transmitted by an upper-level node, a first node determines the availability of a symbol in a first resource set located between a first hard resource set and a second hard resource set, and communicates with the upper-level node on the symbol based on the resource indication information to maximally improve resource utilization.

19 Claims, 13 Drawing Sheets

(56) References Cited

FOREIGN PATENT DOCUMENTS

WO    2018059400 A1    4/2018

OTHER PUBLICATIONS

ATandT, Integrated access and sidelink: A unified concept for V2X. 3GPP TSG RAN WG1 Meeting #92bisR1, Sanya, China, Apr. 16, 20, 2018, R1-1804673, 4 pages.
Samsung: "Resource Multiplexing between Backhaul and AccessLinks",3GPP Draft; R1-1902271,Feb. 15, 2019, total 7 pages.
Ericsson: "IAB semi static configuration for DU resources", 3GPPDRAFT; R1-1900732,Jan. 20, 2019, total 4 pages.
Nokia et al: "NR enhancements to support IAB", 3GPP Draft; R1-1812700,Nov. 11, 2018, total 9 pages.

| | 0 | 1 | 2 | 3 | 4 | 5 | 6 |
|---|---|---|---|---|---|---|---|
| MT of an IAB node | NA | A | A | A | A | A | NA |
| DU of the IAB node | H symbol | S symbol | S symbol | S symbol | S symbol | S symbol | H symbol |

FIG. 4

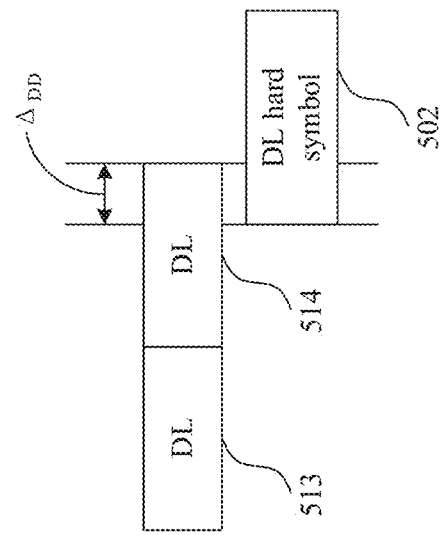
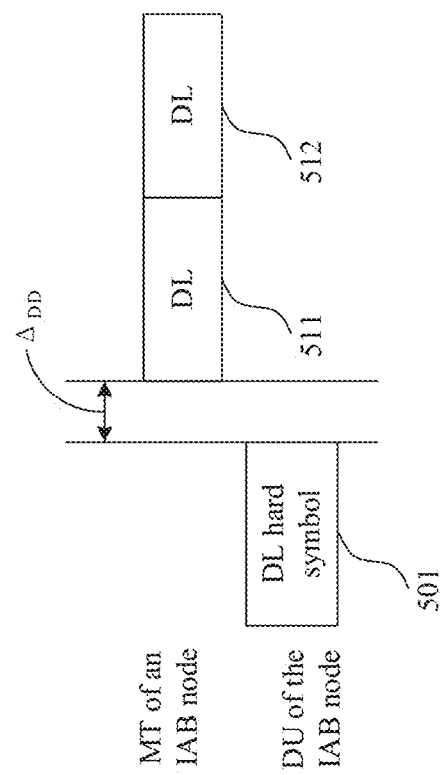
FIG. 5(b)
FIG. 5(a)

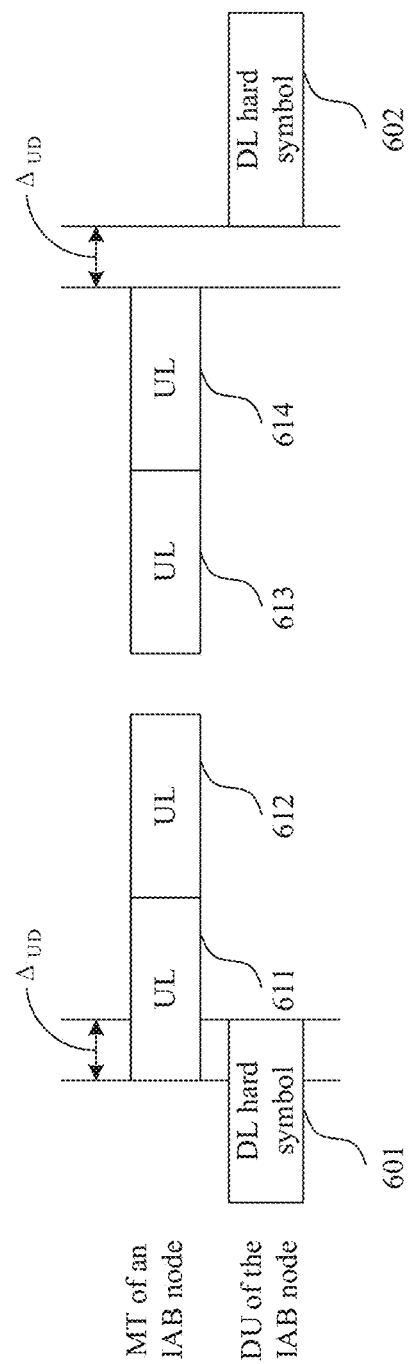

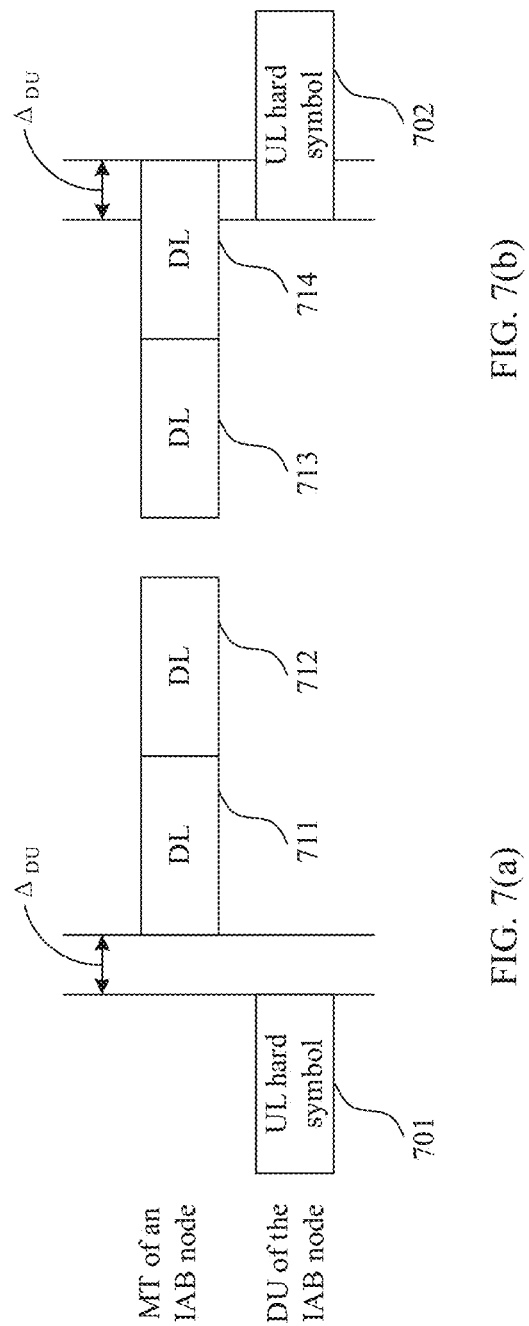

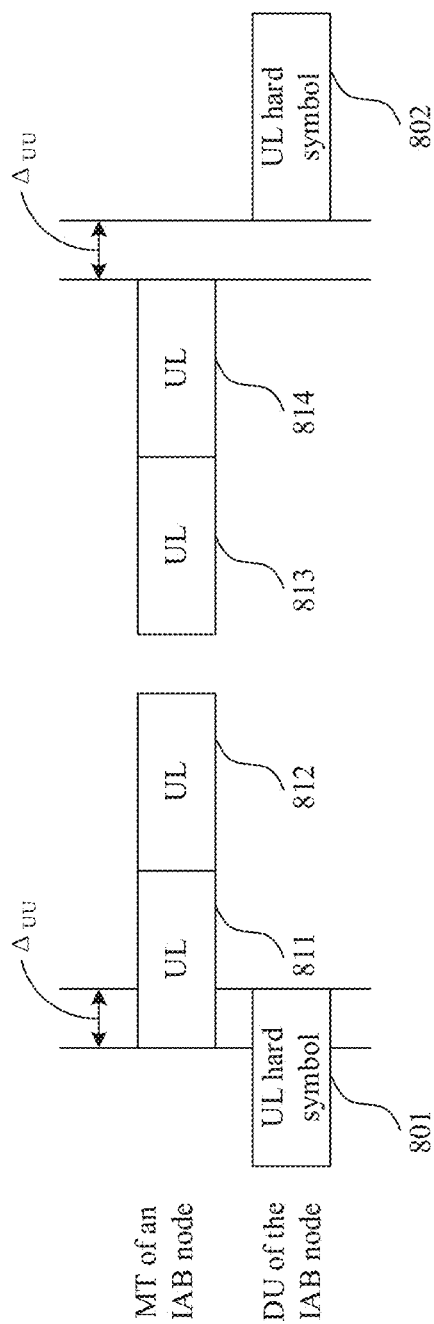

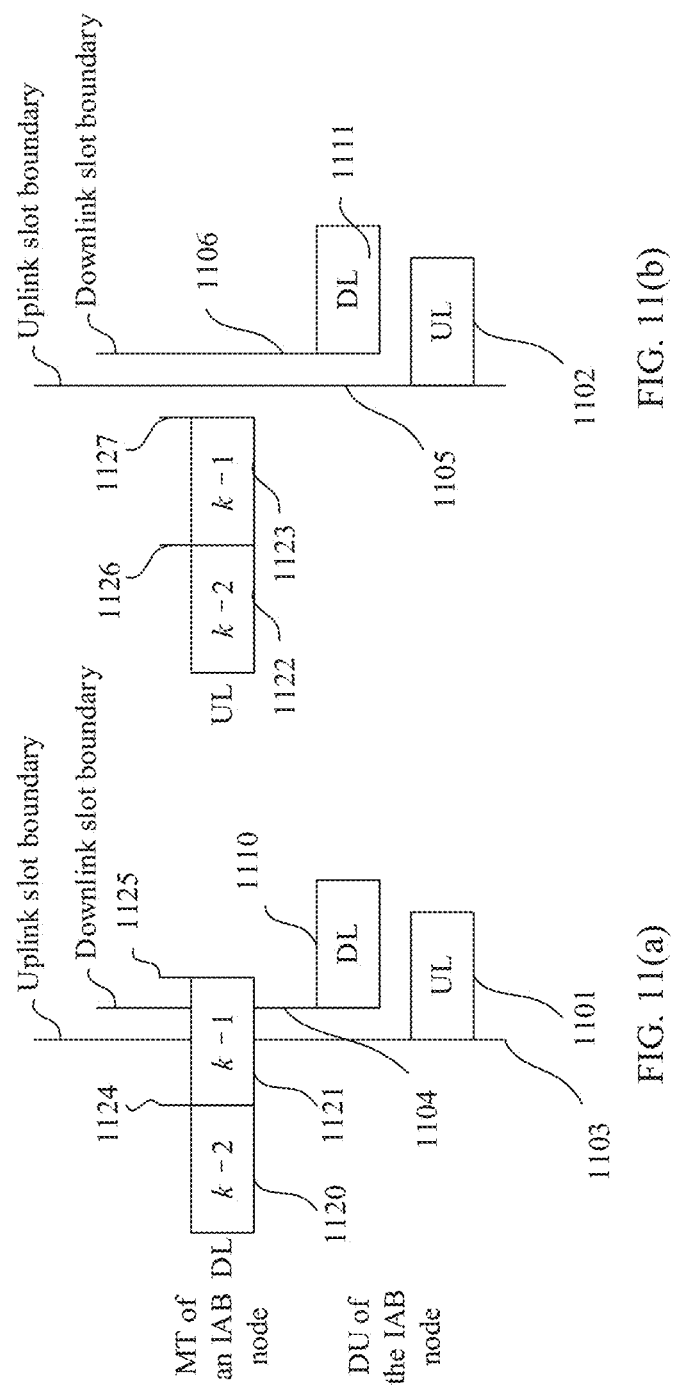

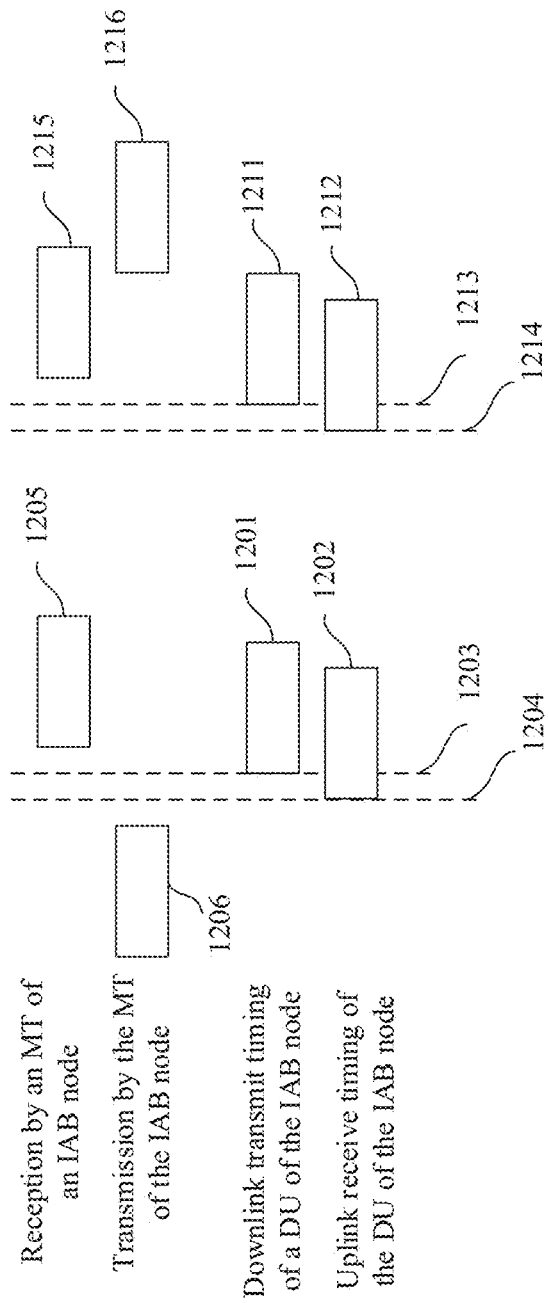

METHOD AND APPARATUS FOR DETERMINING TRANSMISSION RESOURCE

CROSS-REFERENCE TO RELATED APPLICATIONS

This application is a continuation of International Application No. PCT/CN2020/075401, filed on Feb. 14, 2020, which claims priority to Chinese Patent Application No. 201910266905.6, filed on Apr. 3, 2019 and Chinese Patent Application No. 201910253084.2, filed on Mar. 29, 2019. All of the afore-mentioned patent applications are hereby incorporated by reference in their entireties.

TECHNICAL FIELD

The present invention relates to communications technologies, and specifically, to a method and an apparatus for determining a transmission resource of a relay node in a wireless communications system.

BACKGROUND

With continuous development of mobile communications technologies, spectrum resources are increasingly strained. To improve spectrum utilization, base stations will be deployed more densely in the future. In addition, dense deployment can also avoid coverage holes. In a conventional cellular network architecture, a base station is connected to a core network by using an optical fiber. However, fiber deployment costs are very high. A wireless relay node (RN) establishes a connection to the core network by using a wireless backhaul link, so that some of the optical fiber deployment costs can be reduced.

Generally, a wireless relay node establishes a wireless backhaul link to one or more upper-level nodes, and accesses the core network by using the upper-level node. The wireless relay node can provide services for a plurality of lower-level nodes. The upper-level node of the relay node may be a base station or another relay node. A lower-level node of the relay node may be a user equipment (UE), or may be another wireless relay node.

A relay solution supported by new radio (NR) of a 5th generation mobile communications (5th generation mobile networks or 5th generation wireless systems, 5G) radio access network (RAN) is referred to as integrated access and backhaul (JAB). An integrated access and backhaul relay node is referred to as an JAB node.

Multiplexing is performed on resources of an access link and a backhaul link of the JAB node in time division multiplexing mode, space division multiplexing mode, or frequency division multiplexing mode. A time division multiplexing (TDM) scenario is used as an example. The backhaul link and the access link work at different times. Therefore, the JAB node needs to switch between reception and transmission of the backhaul link and reception and transmission of the access link. When switching is performed between the backhaul link and the access link, the JAB node has the highest resource utilization if no transition between receiving and transmitting of a power amplifier is required. However, in implementations, due to various factors such as turn-on/off time of the power amplifier, transmission distance, and non-ideal synchronization, during switching between the backhaul link and the access link, the receive/transmit transition time of the power amplifier cannot be ignored. The receive/transmit transition time of the power amplifier affects symbol resources for transmission on the backhaul link. A problem to be addressed for 5G JAB is how to reduce the spectral efficiency decrease caused by the receive/transmit transition of the power amplifier.

SUMMARY

Embodiments of this application provide a method and an apparatus for determining a resource in a relay system, to solve the problem that when a data transmission transition is performed between an MT (mobile termination) and a DU (distributed unit) of an JAB node in the relay system, excessive overheads are incurred at the transition boundary.

To achieve the foregoing objective, the following technical solutions are used in the embodiments of this application.

According to a first aspect, a method for determining a resource in a relay system is provided, where the method is used by an JAB node to determine an availability status of a resource on an MT, to maximize symbol resource utilization and reduce overheads. The method includes the following steps: A first node receives resource indication information transmitted by an upper-level node, where the resource indication information is used to indicate a transmission direction of a first resource set, the first resource set is located between a first hard resource set and a second hard resource set, and the first hard resource set and the second hard resource set are consecutive hard resources; the first node determines a first threshold x and a second threshold y based on the resource indication information; when $t_3-t_1 \geq x$, and $t_2-t_4 \geq y$, the first node determines that a symbol in the first resource set is available, where $t_1$ is an end time of a last symbol in the first hard resource set, $t_2$ is a start time of a first symbol in the second hard resource set, $t_3$ is a start time of the symbol, and $t_4$ is an end time of the symbol; and the first node communicates with the upper-level node on the first symbol based on the resource indication information. In the foregoing technical solution, an availability status of a symbol in the first resource set is determined, so that symbol resource utilization is maximized, and resource waste caused by resource overlapping is avoided by using a subframe or a slot as a unit, so that spectral efficiency is improved.

In a possible implementation of the first aspect, for different scenarios, the first threshold x and the second threshold y are different. Specifically, in different scenarios, a method for determining the thresholds is as follows:

when a transmission direction of the last symbol in the first hard resource set is downlink transmission, and the transmission direction of the first resource set is downlink transmission, the first threshold $x=T_{TR}$; or when a transmission direction of the last symbol in the first hard resource set is downlink transmission, and the transmission direction of the first resource set is uplink transmission, $x=0$; or when a transmission direction of the last symbol in the first hard resource set is uplink transmission, and the transmission direction of the first resource set is downlink transmission, $x=0$; or when a transmission direction of the last symbol in the first hard resource set is uplink transmission, and the transmission direction of the first resource set is uplink transmission, $x=T_{RT}$; or when a transmission direction of the first symbol in the second hard resource set is downlink transmission, and the transmission direction of the first resource set is downlink transmission, $y=T_{RT}$; or when a transmission direction of the first symbol in the second hard resource set is downlink transmission, and the transmission direction of the first resource set is uplink transmission, y=0; or when a transmission direction of the first symbol in the second hard resource set is uplink transmission, and the transmission direction of the first resource set is downlink transmission, y=0; or when a transmission direction of the first symbol in the second hard resource set is uplink transmission, and the transmission direction of the first resource set is uplink transmission, y=$T_{TR}$, where $T_{RT}$ is a receive-transmit transition time of the first node, and $T_{TR}$ is a transmit-receive transition time of the first node.

In a possible implementation of the first aspect, parameters for determining $t_3-t_1$ and $t_2-t_4$ are different in different scenarios, and specifically depend on different scenarios, including:

when the transmission direction of the last symbol in the first hard resource set is downlink transmission, and the transmission direction of the first resource set is downlink transmission, $t_3-t_1$ and $t_2-t_4$ are determined by $\Delta_{DD}$, where $$\Delta_{DD} = \frac{TA}{2} + T_{delta};$$

or when the transmission direction of the last symbol in the first hard resource set is downlink transmission, and the transmission direction of the first resource set is uplink transmission, $t_3-t_1$ and $t_2-t_4$ are determined by $\Delta_{UD}$, where $\Delta_{UD}$=TA+TA$_{offset}$-$\Delta_{DD}$; or when the transmission direction of the last symbol in the first hard resource set is uplink transmission, and the transmission direction of the first resource set is downlink transmission, $t_3-t_1$ and $t_2-t_4$ are determined by $\Delta_{DU}$, where $\Delta_{DU}$=$T_g$+$\Delta_{DD}$; or when the transmission direction of the last symbol in the first hard resource set is uplink transmission, and the transmission direction of the first resource set is uplink transmission, $t_3-t_1$ and $t_2-t_4$ are determined by $\Delta_{UU}$, where $\Delta_{UU}$=TA+TA$_{offset}$-$\Delta_{DD}$-$T_g$; or when the transmission direction of the first symbol in the second hard resource set is downlink transmission, and the transmission direction of the first resource set is downlink transmission, $t_3-t_1$ and $t_2-t_4$ are determined by $\Delta_{DD}$, where $$\Delta_{DD} = \frac{TA}{2} + T_{delta};$$

or when the transmission direction of the first symbol in the second hard resource set is downlink transmission, and the transmission direction of the first resource set is uplink transmission, $t_3-t_1$ and $t_2-t_4$ are determined by $\Delta_{UD}$, where $\Delta_{UD}$=TA+TA$_{offset}$-$\Delta_{DD}$; or when the transmission direction of the first symbol in the second hard resource set is uplink transmission, and the transmission direction of the first resource set is downlink transmission, $t_3-t_1$ and $t_2-t_4$ are determined by $\Delta_{DU}$, where $\Delta_{DU}$=$T_g$+$\Delta_{DD}$; or when the transmission direction of the first symbol in the second hard resource set is uplink transmission, and the transmission direction of the first resource set is uplink transmission, $t_3-t_1$ and $t_2-t_4$ are determined by $\Delta_{UU}$, where $\Delta_{UU}$=TA+TA$_{offset}$-$\Delta_{DD}$-$T_g$, where TA is a timing advance, $T_{delta}$ is a timing offset, TA$_{offset}$ is a timing advance offset, and $T_g$ is a receive/transmit transition time difference of an access link of the first node.

In a possible implementation of the first aspect, the IAB node may switch from one upper-level node to another upper-level node for a reason, and when the IAB node switches to the other upper-level node, the other upper-level node has not obtained a necessary parameter of the IAB node to determine a status of an available symbol. Therefore, the method includes: the first node switches from a first upper-level node to a second upper-level node; and the first node transmits $T_{delta}$ or $\Delta_{DD}$ to the second upper-level node. In the foregoing technical solution, $T_{delta}$ or $\Delta_{DD}$ is reported to the second upper-level node, so that the second upper-level node can determine a symbol status based on $T_{delta}$ or $\Delta_{DD}$ reported by the IAB node, to keep the symbol status of the first node consistent, and improve resource utilization.

In a possible implementation of the first aspect, the upper-level node may require some information of the IAB node to determine an availability status of a symbol in the first resource set. Therefore, the first node reports $\Delta_{UU}$, or $$\Delta_{UU} - \frac{TA}{2},$$

or $T_g$ to the upper-level node. In the foregoing technical solution, $\Delta_{UU}$, or $$\Delta_{UU} - \frac{TA}{2},$$

or $T_g$ is reported to the second upper-level node, so that the second upper-level node can determine a symbol status based on $\Delta_{UU}$, or $$\Delta_{UU} - \frac{TA}{2},$$

or $T_g$ reported by the IAB node, to keep the symbol status of the the first node consistent, and improve resource utilization.

In a possible implementation of the first aspect, the upper-level node may update the TA. When the TA is updated, the IAB node may need to redetermine $\Delta_{UU}$, and the IAB node may consequently redetermine an available symbol in the first resource set. The method includes: the first node receives a TA update command transmitted by the upper-level node, so that the first node updates are based on the TA update command. In the foregoing technical solution, a TA update is performed to keep synchronization between network nodes to avoid interference, and redetermining an available symbol in the first resource set helps improve spectrum utilization.

According to a second aspect, a method for determining a resource in a relay system is provided, where the method is used by an JAB node to determine an availability status of a resource on an MT, to maximize symbol resource utilization and reduce overheads. The method includes the following steps: A second node obtains a first hard resource set and a second hard resource set of a first node, where the first hard resource set and the second hard resource set are consecutive hard resources, and the second node is an upper-level node of the first node; the second node determines a first resource set, where the first resource set is located between the first hard resource set and the second hard resource set; the second node obtains a first threshold x and a second threshold y; when a time difference $D_h$ between a start time of a symbol and an end time of a last symbol in the first hard resource set is greater than x, and a time difference $D_e$ between a start time of a first symbol in the second hard resource set and an end time of the symbol is greater than y, the second node determines that the symbol in the first resource set is available; and the second node performs data transmission with the first node on the symbol. In the foregoing technical solution, an availability status of a symbol in the first resource set is determined, so that symbol resource utilization is maximized, and resource waste caused by resource overlapping is avoided by using a subframe or a slot as a unit, so that spectral efficiency is improved.

In a possible implementation of the second aspect, for different scenarios, the first threshold x and the second threshold y are different. Specifically, in different scenarios, a method for determining the thresholds is as follows:
  when a transmission direction of the last symbol in the first hard resource set is downlink transmission, and a transmission direction of the first resource set is downlink transmission, the first threshold $x=T_{TR}$; or
  when a transmission direction of the last symbol in the first hard resource set is downlink transmission, and a transmission direction of the first resource set is uplink transmission, x=0; or
  when a transmission direction of the last symbol in the first hard resource set is uplink transmission, and a transmission direction of the first resource set is downlink transmission, x=0; or
  when a transmission direction of the last symbol in the first hard resource set is uplink transmission, and a transmission direction of the first resource set is uplink transmission, $x=T_{RT}$; or
  when a transmission direction of the first symbol in the second hard resource set is downlink transmission, and a transmission direction of the first resource set is downlink transmission, $y=T_{RT}$; or
  when a transmission direction of the first symbol in the second hard resource set is downlink transmission, and a transmission direction of the first resource set is uplink transmission, y=0; or
  when a transmission direction of the first symbol in the second hard resource set is uplink transmission, and a transmission direction of the first resource set is downlink transmission, y=0; or
  when a transmission direction of the first symbol in the second hard resource set is uplink transmission, and a transmission direction of the first resource set is uplink transmission, $y=T_{TR}$, where
  $T_{RT}$ is a receive-transmit transition time of the first node, and $T_{TR}$ is a transmit-receive transition time of the first node.

In a possible implementation of the second aspect, the second node needs to transmit resource indication information to the first node, so that the first node determines an availability status of a symbol in a first resource set on the MT of the first node based on the resource indication information. The method includes: the second node transmits resource indication information to the first node, where the resource indication information is used to indicate the transmission direction of the first resource set. In the foregoing technical solution, the resource indication information is transmitted to the first node, so that the first node obtains the transmission direction of the first resource set on the MT, to determine an availability status of a symbol based on the transmission direction to improve spectral efficiency.

In the foregoing technical solution, when the pattern transition sequence and/or the pattern configuration information are/is reconfigured, consistency of information of the nodes is maintained, to avoid a case in which the nodes are not coordinated with each other and cannot be detected or discovered during mutual measurement.

In a possible implementation of the second aspect, the second node needs to obtain parameter information of the first node, to determine an availability status of a symbol on the MT of the first node. The method includes: the second node receives $\Delta_{UU}$, or $$\Delta_{UU} - \frac{TA}{2},$$

or $T_g$ reported by the first node, where TA is a timing advance, $\Delta_{UU}$ is a time difference between an uplink transmit frame of a backhaul link of the first node and a boundary of an uplink receive frame of an access link of the first node, and $T_g$ is a receive/transmit transition time difference of the access link of the first node. In the foregoing technical solution, the second node may determine an availability status of a symbol in the first resource set by using the parameter reported by the first node, to improve spectrum utilization of the backhaul link of the first node.

In a possible implementation of the second aspect, determining $D_h$ and $D_e$ in different scenarios specifically depends on different scenarios, and specifically includes: when the transmission direction of the last symbol in the first hard resource set is downlink transmission, and the transmission direction of the first resource set is downlink transmission, $D_h$ and $D_e$ are determined by $\Delta_{DD}$, where $$\Delta_{DD} = \frac{TA}{2} + T_{delta};$$

or
  when the transmission direction of the last symbol in the first hard resource set is downlink transmission, and the transmission direction of the first resource set is uplink transmission, $D_h$ and $D_e$ are determined by $\Delta_{UD}$, where $\Delta_{UD}=TA+TA_{offset}-\Delta_{DD}$; or
  when the transmission direction of the last symbol in the first hard resource set is uplink transmission, and the transmission direction of the first resource set is downlink transmission, $D_h$ and $D_e$ are determined by $\Delta_{DU}$, where $\Delta_{DU}=T_g+\Delta_{DD}$; or
  when the transmission direction of the last symbol in the first hard resource set is uplink transmission, and the transmission direction of the first resource set is uplink transmission, $D_h$ and $D_e$ are determined by $\Delta_{UU}$, where $\Delta_{UU}=TA+TA_{offset}-\Delta_{DD}\ T_g$; or
  when the transmission direction of the first symbol in the second hard resource set is downlink transmission, and the transmission direction of the first resource set is downlink transmission, $D_h$ and $D_e$ are determined by $\Delta_{DD}$; or when the transmission direction of the first symbol in the second hard resource set is downlink transmission, and the transmission direction of the first resource set is uplink transmission, $D_h$ and $D_e$ are determined by $\Delta_{UD}$; or when the transmission direction of the first symbol in the second hard resource set is uplink transmission, and the transmission direction of the first resource set is downlink transmission, $D_h$ and $D_e$ are determined by $\Delta_{DU}$; or when the transmission direction of the first symbol in the second hard resource set is uplink transmission, and the transmission direction of the first resource set is uplink transmission, $D_h$ and $D_e$ are determined by $\Delta_{UU}$, where TA is the timing advance, $T_{delta}$ is a timing offset, $TA_{offset}$ is a timing advance offset, and $T_g$ is the receive/transmit transition time difference of the access link of the first node.

In a possible implementation of the second aspect, node number information includes one of a configured node number, a cell identity cell ID, a physical cell identifier PCI, a radio network temporary identifier RNTI, a MAC address, and an IP address.

In a possible implementation of the second aspect, the upper-level node may update the TA to implement more accurate time synchronization; therefore, the second node transmits a TA update command to the first node, causing the first node to adjust a parameter and report the parameter, so that the second node can determine an availability status of a symbol in the first resource set on the MT of the first node. The method includes: the second node transmits a TA update command to the first node, where the TA update command is used by the first node to update $\Delta_{DD}$, $\Delta_{UU}$, $\Delta_{UD}$, or $\Delta_{DU}$.

According to still another aspect of this application, a first node is provided. The first node is configured to implement a function of the method for determining a resource in a relay system according to any one of the first aspect or possible implementations of the first aspect. The function may be implemented by hardware, or may be implemented by hardware by executing corresponding software. The hardware or software includes one or more units corresponding to the foregoing function.

In a possible implementation, a structure of the first node includes a processor, and the processor is configured to support the first node in performing the method for determining a resource in a relay system according to any one of the first aspect or possible implementations of the first aspect. Optionally, the first node may further include a memory and a communications interface. The memory stores code and data, the memory is coupled to the processor, and the communications interface is coupled to the processor or the memory.

According to still another aspect of this application, a second node is provided. The second node is configured to implement a function of the method for determining a resource in a relay system according to any one of the second aspect or possible implementations of the second aspect. The function may be implemented by hardware, or may be implemented by hardware by executing corresponding software. The hardware or software includes one or more units corresponding to the foregoing function.

In a possible implementation, a structure of the second node includes a processor, and the processor is configured to support the second node in performing the method for determining a resource in a relay system according to any one of the second aspect or possible implementations of the second aspect. Optionally, the second node may further include a memory and a communications interface. The memory stores code required by processor and/or a baseband processor, the memory is coupled to the processor, and the communications interface is coupled to the memory or the processor.

According to still another aspect of this application, a computer-readable storage medium is provided. The computer-readable storage medium stores an instruction. When the instruction is run on a computer, the computer is enabled to perform the method for determining a resource in a relay system according to any one of the first aspect or possible implementations of the first aspect, or performs the method for determining a resource in a relay system according to any one of the second aspect or possible implementations of the second aspect.

According to still another aspect of this application, a computer program product including an instruction is provided. When the computer program product is run on a computer, the computer is enabled to perform the method for determining a resource in a relay system according to any one of the first aspect or possible implementations of the first aspect, or performs the method for determining a resource in a relay system according to any one of the second aspect or possible implementations of the second aspect.

According to still another aspect of this application, a communications system is provided. The communications system includes a plurality of devices, and the plurality of devices include a first node and a second node. The first node is the first node provided in the foregoing aspects, and is configured to perform the method for determining a resource in a relay system according to any one of the first aspect or possible implementations of the first aspect; and/or the second node is the second node provided in the foregoing aspects, and is configured to support the second node in performing the method for determining a resource in a relay system according to any one of the second aspect or possible implementations of the second aspect.

According to still another aspect of this application, an apparatus is provided. The apparatus is a processor, an integrated circuit, or a chip, and is configured to perform steps performed by a processing unit of a first node in an embodiment of this application, for example, determining an availability status of a symbol in a first resource set. The apparatus is further configured to perform processing or actions of the first node described in the other aspects or embodiments. Details are not described herein again.

According to still another aspect of this application, another apparatus is provided. The apparatus is a processor, an integrated circuit, or a chip, and is configured to perform steps performed by a processing unit of a second node in an embodiment of this application and support the second node in determining an availability status of a symbol in the first resource set in the foregoing embodiment. The other apparatus is further configured to perform processing or actions of the second node described in the other aspects or embodiments. Details are not described herein again.

It may be understood that the apparatus, computer storage medium, and computer program product for determining a resource in a relay system that are provided above are all configured to perform the corresponding method provided above. Therefore, for beneficial effects that can be achieved by the apparatus, computer storage medium, or computer program product, refer to beneficial effects in the corresponding method provided above. Details are not described herein again.

BRIEF DESCRIPTION OF DRAWINGS

FIG. 4 shows a schematic diagram of a relationship between an H/S resource of a DU and an available or unavailable resource of an MT according to an embodiment of this application;

FIG. 5(a) and FIG. 5(b) show a schematic diagram in which an MT of an IAB node performs downlink reception and a DU performs downlink transmission according to an embodiment of this application;

FIG. 6(a) and FIG. 6(b) show a schematic diagram in which an MT of an IAB node performs uplink transmission and a DU performs downlink transmission according to an embodiment of this application;

FIG. 7(a) and FIG. 7(b) show a schematic diagram in which an MT of an IAB node performs downlink reception and a DU performs uplink reception according to an embodiment of this application;

FIG. 8(a) and FIG. 8(b) show a schematic diagram in which an MT of an IAB node performs uplink transmission and a DU performs uplink reception according to an embodiment of this application;

FIG. 11(a) and FIG. 11(b) show a schematic diagram for determining an availability status of one or more symbols in a first resource set before a second hard resource set according to an embodiment of this application;

FIG. 12(a) and FIG. 12(b) show a schematic diagram of different transmission statuses of two consecutive first resource sets on an MT of an IAB node according to an embodiment of this application;

DESCRIPTION OF EMBODIMENTS

The following describes the technical solutions in embodiments of this application with reference to the accompanying drawings in the embodiments of this application. It is clear that the described embodiments are merely some but not all of the embodiments of this application. All other embodiments obtained by a person skilled in the art based on the embodiments of this application without creative efforts shall fall within the protection scope of the present invention.

In the descriptions of this application, unless otherwise specified, the character "/" indicates an "or" relationship. For example, A/B may represent A or B. The term "and/or" in this specification describes only an association relationship for associated objects and represents that three relationships may exist. For example, A and/or B may represent the following three cases: Only A exists, both A and B exist, and only B exists. In addition, in the descriptions of this application, unless otherwise specified, "a plurality of" means two or more than two. In the embodiments of this application, "including one or more of A or B" may represent the following three cases: including A, including A and B, and including B. In the embodiments of this application, "including one or more of A, B, or C" may represent the following seven cases: including A, B, and C, including A and B, including A and C, including B and C, including A, including B, and including C.

It should be understood that names of all nodes and messages in this application are merely names specified in this application for ease of description and that names in an actual network may be different. It should not be understood that names of various nodes and messages are limited in this application. On the contrary, any name having functions that are the same as or similar to functions of a node or message used in this application is considered as a method or an equivalent replacement in this application, and falls within the protection scope of this application. This is not described again subsequently.

Considering a high bandwidth of a future wireless network, introduction of an IAB solution is considered for NR, to further reduce deployment costs and improve deployment flexibility. Therefore, an integrated access and backhaul relay is introduced. In this application, a relay node with functions of integrated access and backhaul is referred to as an integrated access and backhaul node (IAB node), to distinguish from a relay in a long term evolution (LTE) system.

Figure 1:
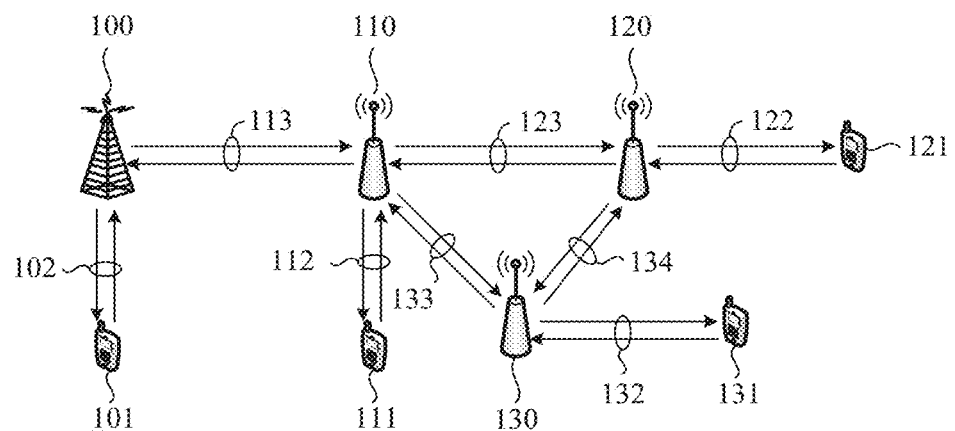
FIG. 1 shows an IAB communications system according to an embodiment of this application.

To better understand a method and an apparatus for determining a resource in a relay system that are disclosed in the embodiments of this application, the following first describes a network architecture used in the embodiments of this application. FIG. 1 is a schematic structural diagram of a communications system to which an embodiment of this application is applicable.

It should be noted that the communications system mentioned in this embodiment of this application includes but is not limited to a narrowband Internet of Things (NB-IoT) system, a wireless local area network (WLAN) system, an LTE system, a next-generation 5G mobile communications system, or a communications system after 5G, such as an NR communications system or a device to device (D2D) communications system.

In the communications system shown in FIG. 1, an integrated access and backhaul JAB system is provided. The JAB system includes at least one base station 100, one or more terminal devices 101 served by the base station 100, one or more relay nodes JAB nodes, and one or more terminal devices 111 served by the JAB node 110. The base station 100 is generally referred to as a donor base station (DgNB). The JAB node 110 is connected to the base station 100 by using a wireless backhaul link 113. The donor base station is also referred to as a donor node in this application. The base station includes but is not limited to an evolved NodeB (eNB), a radio network controller (RNC), a NodeB (NB), a base station controller (base station controller, BSC), a base transceiver station (BTS), a home base station (for example, a home evolved NodeB or a home node B, HNB), a baseband unit (BBU), an eLTE (eLTE) base station, an NR base station (gNB), or the like. The terminal device includes but is not limited to any one of user equipment (UE), a mobile station, an access terminal, a subscriber unit, a subscriber station, a mobile station, a remote station, a remote terminal, a mobile device, a terminal, a wireless communications device, a user agent, a station (ST) in a wireless local area network (WLAN), a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a mobile station in a future 5G network, and a terminal device in a future evolved public land mobile network (PLMN). The JAB node is a specific name of a relay node, and does not constitute a limitation on the solution in this application. The JAB node may be one of the foregoing base stations or terminal devices with a forwarding function, or may be in a form of an independent device.

The integrated access and backhaul system may further include a plurality of other JAB nodes, such as an JAB node 120 and an JAB node 130. The JAB node 120 is connected to the JAB node 110 by using a wireless backhaul link 123, to access the network. The JAB node 130 is connected to the JAB node 110 by using a wireless backhaul link 133, to access the network. The JAB node 120 serves one or more terminal devices 121. The JAB node 130 serves one or more terminal devices 131. In FIG. 1, both the JAB node 110 and the JAB node 120 are connected to the network by using wireless backhaul links. In this application, the wireless backhaul links are all viewed from a perspective of the relay node. For example, the wireless backhaul link 113 is a backhaul link of the JAB node 110, and the wireless backhaul link 123 is a backhaul link of the JAB node 120.

As shown in FIG. 1, one JAB node, such as 120, may be connected to another JAB node 110 by using a wireless backhaul link, such as 123, and thereby connected to the network, and the relay node may be connected to the network via a plurality of wireless relay nodes. It should be understood that the JAB node in this application is used merely for description, and does not mean that the solution of this application is used only in an NR scenario. In this application, the JAB node may generally refer to any node or device that has a relay function. It should be understood that the JAB node and the relay node in this application have the same meaning.

Generally, a lower-level node may be considered as UE of an upper-level node. It should be understood that, in the integrated access and backhaul system shown in FIG. 1, one JAB node is connected to one upper-level node. However, in a future relay system, to improve reliability of a wireless backhaul link, one JAB node, for example, an JAB node 120, may be served by a plurality of upper-level nodes simultaneously. For example, in the figure, the JAB node 130 may be further connected to the JAB node 120 by using a backhaul link 134. In other words, both the JAB node 110 and the JAB node 120 are upper-level nodes of the JAB node 130. Names of the JAB nodes 110, 120, and 130 do not limit the scenario or the network in which the JAB nodes are deployed, and may be of any other names, such as relay or RN. This application uses the JAB node only for ease of description.

In FIG. 1, wireless link 102, 112, 122, 132, 113, 123, 133, and 134 may be bidirectional links, including uplink and downlink transmission links. In particular, the wireless backhaul links 113, 123, 133, and 134 may be used by upper-level nodes to provide services for lower-level nodes. For example, the upper-level node 100 provides a wireless backhaul service for the lower-level node 110. It should be understood that an uplink and a downlink of a backhaul link may be separated, that is, uplink transmission and downlink transmission are not performed by using the same node. The downlink transmission means that an upper-level node, such as the node 100, transmits information or data to a lower-level node, such as the node 110. The uplink transmission means that a lower-level node, such as the node 110, transmits information or data to an upper-level node, such as the node 100. The node is not limited to a network node or a terminal device. For example, in a D2D scenario, the terminal device may act as a relay node to serve another terminal device. In some scenarios, a wireless backhaul link may also be an access link. For example, the backhaul link 123 may also be considered as an access link for the node 110, and the backhaul link 113 is also an access link for the node 100. For the node 110, the link 113 is referred to as an upper-level backhaul link (parent BH), the link 123 is referred to as a low-level backhaul (child BH), and the link 112 is referred to as an access link. It should be understood that the upper-level node may be a base station or may be a relay node and that the lower-level node may be a relay node or may be a terminal device having a relay function. For example, in a D2D scenario, the lower-level node may also be a terminal device.

The relay nodes shown in FIG. 1, such as 110, 120, and 130, may exist in two forms: One is that the relay nodes exist as independent access nodes and can independently manage terminal devices accessing the relay nodes. In this case, the relay nodes generally have independent physical cell identifiers (PCI). A relay in this form generally needs to have a complete protocol stack function, such as a radio resource control (RRC) function, and this relay is generally referred to as a layer 3 relay. However, a relay node in the other form and a donor node such as a donor eNB or a donor gNB belong to the same cell, and user management is performed by a donor base station, such as the donor node. This relay is generally referred to as a layer 2 relay.

A layer 2 relay generally exists as a DU of a base station DgNB in a separated NR control and bearer (For example, central unit and distributed unit, CU-DU) architecture, and communicates with a CU by using an F1-AP (F1 application protocol) interface or a tunneling protocol. The tunneling protocol may be, for example, the GTP (general packet radio service tunneling protocol) protocol, and the F1-AP may be an F1-AP enhanced interface. Details are not described again.

The donor node is a node that other device can through it to access a core network, or is an anchor base station that is in a radio access network and through which the network can be accessed. The anchor base station is responsible for receiving data from the core network and forwarding the data to a relay node, or receiving data from a relay node and forwarding the data to the core network.

For ease of description, the following describes basic terms or concepts used in this application.

Upper-level node: It is a node that provides wireless backhaul link resources. For example, 110 is referred to as an upper-level node of the JAB node 120. The upper-level node may also be referred to as an upstream node. It should be understood that the upper-level node is not limited to a direct upper-level node that provides wireless backhaul link resources, but includes any node that provides wireless backhaul link resources on a transmission link to the donor base station. The direct upper-level node is a node that directly provides transmission resources for the relay node. For example, the JAB node 110 is a direct upper-level node of the JAB node 120.

Lower-level node: A node that uses backhaul link resources to transmit data to the network or receive data from the network is referred to as a lower-level node. For example, 120 is referred to as a lower-level node of the relay node 110, and the network is the core network or another network above the access network, such as the Internet or a dedicated network. Similarly, the lower-level node is not limited to a direct lower-level node that provides wireless backhaul link resources, but includes any node that provides wireless backhaul link resources on a transmission link to a target node. The direct lower-level node is a node that directly provides transmission resources. For example, the JAB node 120 is a direct lower-level node of the JAB node 110.

Access link: It is a link between the UE and the JAB node, or between the UE and the IAB donor node. Alternatively, the access link includes a wireless link used when a node communicates with a lower-level node of the node. The access link includes an uplink access link and a downlink access link. The uplink access link is used for uplink transmission of the access link, and the downlink access link used for downlink transmission of the access link.

Backhaul link: It is a link between the JAB node and an JAB child node or between the JAB node and an JAB parent node. The backhaul link includes a downlink transmission link between the JAB node and the JAB child node or between the JAB node and the IAB parent node. The backhaul link also includes an uplink transmission link between the JAB node and the JAB child node or between the JAB node and the JAB parent node. For the JAB node, transmitting data to the IAB parent node or receiving uplink data transmitted by the JAB child node is referred to as uplink transmission of the backhaul link. For the JAB node, receiving data transmitted by the JAB parent node or transmitting data to the IAB child node is referred to as downlink transmission of the backhaul link. To distinguish between the UE and the IAB node, the backhaul link between the IAB node and the IAB parent node is also referred to as an upper-level backhaul link (parent BH), and the backhaul link between the IAB node and the IAB child node is referred to as a lower-level backhaul link (child BH).

Waveform parameter: It is a physical subcarrier parameter of a subcarrier set, or a specific bandwidth, or a part of a carrier. The waveform parameter includes at least one of the following parameters: a subcarrier spacing, a cyclic prefix (CP) length, a time interval (TTI), a symbol length, a quantity of symbols, and $\mu$, where $\mu$ is an integer greater than or equal to 0 and may be a value from 0 to 5, each $\mu$ corresponds to a specific subcarrier spacing and CP, and a relationship between the subcarrier spacing and $\mu$ is $\Delta f = 2^{\mu} \cdot 15$ [kHz], where $\Delta f$ is the subcarrier spacing, Hz is a basic frequency unit, and kHz represents kilo Hz, that is, kilohertz.

Slot: It is a basic time domain unit in NR. One slot may include 14 or 12 symbols, depending on a CP length in a waveform parameter used by the slot. It should be understood that, in some cases, the slot is the same as a subframe. For example, when the subcarrier spacing in the waveform parameter is 15 kHz, the slot and the subframe may be the same. Likewise, the slot should not be limited to the foregoing definition. In some cases, a mini-slot may also be defined, that is, one or more symbols may also be referred to as one slot. The slot in this application includes a concept of a mini-slot. The symbol generally refers to an orthogonal frequency division multiplexing (OFDM) symbol. However, it should not be understood that the symbol is limited to the OFDM symbol. The symbol may further include another waveform symbol, such as a single carrier orthogonal frequency division multiplexing symbol. One subframe may be, for example, 1 ms, and one subframe may include one or more slots. When one subframe includes only one slot, the subframe and the slot are the same. The slot or the subframe in the following descriptions may refer to a slot or a subframe. In some cases, the subframe and the slot are the same. In some cases, the subframe and the slot are different. Therefore, the slot or the subframe generally refers to a basic unit for scheduling. The slot may be a mini-slot. This is not described again subsequently.

Beam: It is a communication resource. The beam may be a wide beam, a narrow beam, or another type of beam. A beam forming technology may be a beamforming technology or another technical means. The beamforming technology may be specifically a digital beamforming technology, an analog beamforming technology, or a hybrid digital/analog beamforming technology. Different beams may be considered as different resources. Same information or different information may be transmitted by using different beams. Optionally, a plurality of beams having the same communication characteristic or similar communication characteristics may be considered as one beam. A beam may be formed by one or more antenna ports, and is used to transmit a data channel, a control channel, a sounding signal, and the like. For example, a transmit beam may refer to distribution of signal strength formed in different spatial directions after signals are transmitted by an antenna, and a receive beam may refer to distribution of signals enhanced or weakened in different spatial directions by an antenna array during reception. It may be understood that one or more antenna ports forming one beam may also be considered as one antenna port set. In the current NR protocol, a beam may be embodied by using an antenna port quasi colocation (QCL) relationship. Specifically, two signals of the same beam have a QCL relationship with respect to a spatial domain receive parameter (spatial Rx parameter), that is, QCL-Type D in the protocol: {Spatial Rx parameter}. In the protocol, the beam may be specifically represented by using identifiers of various signals, for example, a resource ID of a CSI-RS, a time domain index of an SS/PBCH, a resource ID of an SRS (sounding reference signal), and a resource ID of a TRS (tracking reference signal). The antenna port is a logical concept, and is not in a one-to-one correspondence to a physical antenna. The antenna port is a logical unit formed by one or more physical antennas for transmitting a signal or a signal stream.

In NR, the IAB node includes two main functions: a mobile termination (MT) function and a distributed unit (DU) function. On an MT, the IAB node may perform uplink transmission and/or downlink transmission with the upper-level node. On a DU, the IAB node may perform uplink transmission and/or downlink transmission with the lower-level node.

Figure 2:
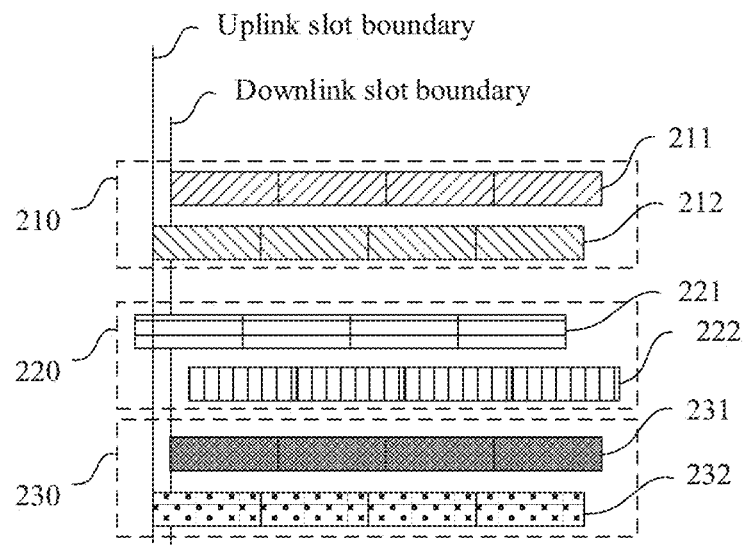
FIG. 2 shows a frame structure between an IAB node and a donor base station or an upper-level node according to an embodiment of this application.

FIG. 2 shows a frame structure between the IAB node and the donor base station or the upper-level node. FIG. 2 shows only a frame structure of the donor base station or a DU of the upper-level node. In FIG. 2, 210 is a frame structure between the IAB node and the donor base station or the upper-level node, where 211 is a frame structure for downlink transmission, and 212 is a frame structure for uplink transmission. 220 is a frame structure of the MT of the IAB node, and 230 is a frame structure of the DU of the IAB node. 221 is a frame structure for downlink transmission by the MT of the IAB node, 222 is a frame structure for uplink reception by the MT of the IAB node, 231 is a frame structure for downlink transmission by the DU of the IAB node, and 232 is a frame structure for uplink reception by the DU of the IAB node. In FIG. 2, it is assumed that a frame timing of the DU of the JAB node is synchronized with a frame timing of the upper-level node.

Figure 3:
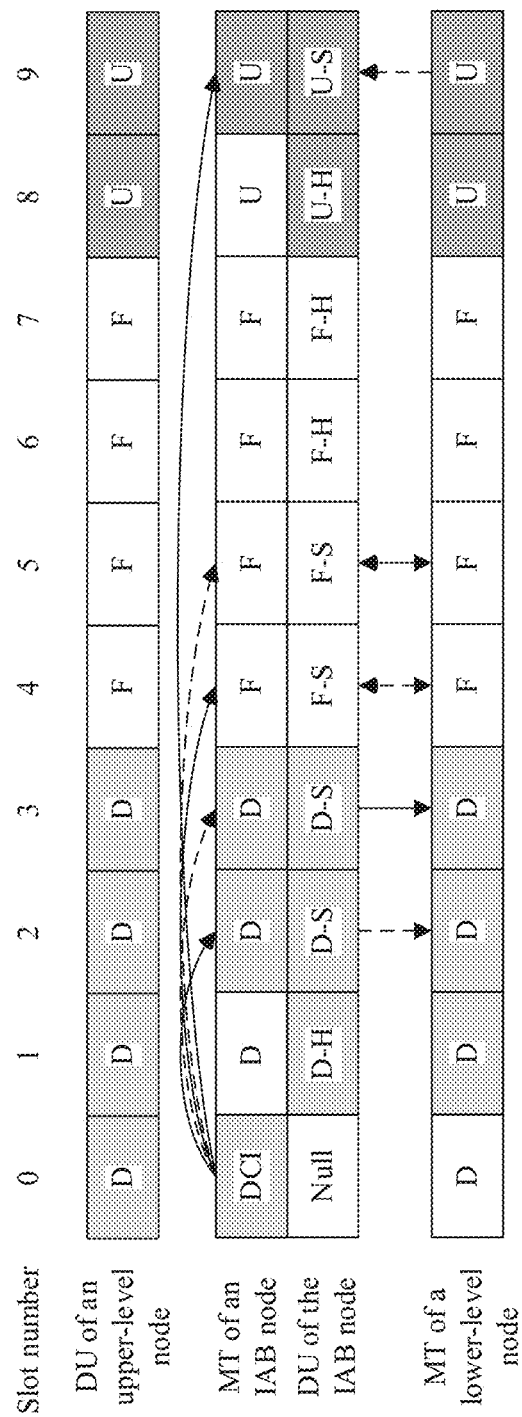
FIG. 3 shows a schematic diagram of a resource configuration of an IAB node according to an embodiment of this application.

FIG. 3 is a schematic diagram of a resource configuration of the JAB node in NR. In FIG. 3, time division duplex (TDD) is used as an example. Three types of MT resources of the IAB node may be configured: downlink (D), uplink (U), and flexible (F). The F type of resource may be configured for uplink transmission or downlink transmission, and whether the resource is specifically used for uplink transmission or downlink transmission depends on a signaling configuration.

Four types of DU resources of the JAB node may be configured: downlink, uplink, flexible, and unavailable (Null, N). Further, the downlink, uplink, and flexible types of resources of the DU may be further classified into hard (H) resources and soft (S) resources. A hard resource of the DU represents a resource that is always available for the DU. Whether a soft resource is available for the DU needs to depend on an indication of the upper-level node (for example, the donor node). In FIG. 3, the upper-level node controls use of the S resource on the DU of the JAB node by using downlink control information (DCI) in a downlink slot or subframe. The H resource and the S resource are semi-statically configured by the donor base station or the upper-level node by using RRC signaling, or semi-statically configured by the donor base station by using the F1-AP protocol.

The MT of the JAB node is connected to the DU of the upper-level node, and the DU of the JAB node is connected to an MT of the lower-level node. After the resources are semi-statically configured (for example, by using RRC signaling), the JAB node may obtain resource configurations of the MT resources and the DU resources of the JAB node separately. For example, the resource configurations may include the transmission directions (D/U/F) of the MT resources and DU resources, the types (soft/hard) of the DU resources, and the positions of null resources of the DU.

With reference to FIG. 3 and the following Table 1, it can be learned that for the JAB node, MT Resources (for example, MT resources corresponding to slots 1, 6, 7, and 8) corresponding to hard resources of the DU (for example, DU resources corresponding to slots 1, 6, 7, and 8) are unavailable. It should be understood that the slot number in FIG. 3 may also be a subframe number or a symbol number. The following mainly uses a slot as an example for description, and this is not described again.

Specifically, with reference to the foregoing description, the MT of the JAB node has three types of resources, and the DU of the JAB node has seven types of resources. After any type of resource of the MT is combined with any type of resource of the DU, possible statuses of reception and transmission by the MT of the JAB node and the corresponding DU are shown in the following Table 1 and Table 2. Table 1 shows resource configurations of the MT and the DU in a time division multiplexing scenario in various possible combinations of resource types. Table 2 shows resource configurations of the MT and the DU in a space division multiplexing (SDM) scenario in various possible combinations of resource types.

TABLE 1

| DU resource type | MT resource type | | |
|---|---|---|---|
| | D | U | F |
| D-H | DU: Tx<br>MT: Null | DU: Tx<br>MT: Null | DU: Tx<br>MT: Null |
| D-S | When the DU resource is IA,<br>DU: Tx<br>MT: Null<br>When the DU resource is INA,<br>DU: Null<br>MT: Rx | When the DU resource is IA,<br>DU: Tx<br>MT: Null<br>When the DU resource is INA,<br>DU: Null<br>MT: Tx | When the DU resource is IA,<br>DU: Tx<br>MT: Null<br>When the DU resource is INA,<br>DU: Null<br>MT: Tx/Rx |
| U-H | DU: Rx<br>MT: Null | DU: Rx<br>MT: Null | DU: Rx<br>MT: Null |
| U-S | When the DU resource is IA,<br>DU: Rx<br>MT: Null<br>When the DU resource is INA,<br>DU: Null<br>MT: Rx | When the DU resource is IA,<br>DU: Rx<br>MT: Null<br>When the DU resource is INA,<br>DU: Null<br>MT: Tx | When the DU resource is IA,<br>DU: Rx<br>MT: Null<br>When the DU resource is INA,<br>DU: Null<br>MT: Tx/Rx |
| F-H | DU: Tx/Rx<br>MT: Null | DU: Tx/Rx<br>MT: Null | DU: Tx/Rx<br>MT: Null |
| F-S | When the DU resource is IA,<br>DU: Tx/Rx<br>MT: Null<br>When the DU resource is INA,<br>DU: Null<br>MT: Rx | When the DU resource is IA,<br>DU: Tx/Rx<br>MT: Null<br>When the DU resource is INA,<br>DU: Null<br>MT: Tx | When the DU resource is IA,<br>DU: Tx/Rx<br>MT: Null<br>When the DU resource is INA,<br>DU: Null<br>MT: Tx/Rx |
| NULL | DU: Null<br>MT: Rx | DU: Null<br>MT: Tx | DU: Null<br>MT: Tx/Rx |

TABLE 2

| DU resource type | MT resource type | | |
|---|---|---|---|
| | DL | UL | F |
| DL-H | DU: Tx<br>MT: Null | DU: Tx<br>MT: Tx | DU: Tx<br>MT: Tx |
| DL-S | When the DU resource is IA,<br>DU: Tx<br>MT: Null<br>When the DU resource is INA,<br>DU: Null<br>MT: Rx | When the DU resource is IA,<br>DU: Tx<br>MT: Tx<br>When the DU resource is INA,<br>DU: Null<br>MT: Tx | When the DU resource is IA,<br>DU: Tx<br>MT: Tx<br>When the DU resource is INA,<br>DU: Null<br>MT: Tx/Rx |
| UL-H | DU: Rx<br>MT: Rx | DU: Rx<br>MT: Null | DU: Rx<br>MT: Rx |
| UL-S | When the DU resource is IA,<br>DU: Rx | When the DU resource is IA,<br>DU: Rx | When the DU resource is IA,<br>DU: Rx (only when the |

TABLE 2-continued

| DU resource type | MT resource type | | |
|---|---|---|---|
| | DL | UL | F |
| | MT: Rx<br>When the DU resource is INA,<br>DU: Null<br>MT: Rx | MT: Null<br>When the DU resource is INA,<br>DU: Null<br>MT: Tx | DU of IAB knows in advance that the MT of IAB is in the Rx state)<br>MT: Rx<br>When the DU resource is INA,<br>DU: Null<br>MT: Tx/Rx |
| F-H | DU: Tx/Rx<br>MT: Rx (only when the upper-level node knows in advance that the DU of IAB is in the Rx state) | DU: Tx/Rx<br>MT: Tx (only when the upper-level node knows in advance that the DU of IAB is in the Tx state) | DU: Tx/Rx<br>MT: Tx (only when the DU of the upper-level node knows in advance that the DU of IAB is in the Tx state), or Rx (only when the DU of the upper-level node knows in advance that the DU of IAB is in the Rx state) |
| F-S | When the DU resource is IA,<br>DU: Tx/Rx<br>MT: Rx (only when the upper-level node knows in advance that the DU of IAB is in the Rx state)<br>When the DU resource is INA,<br>DU: Null<br>MT: Rx | When the DU resource is IA,<br>DU: Tx/Rx<br>MT: Tx (only when the upper-level node knows in advance that the DU of IAB is in the Tx state)<br>When the DU resource is INA,<br>DU: Null<br>MT: Tx | When the DU resource is IA,<br>DU: Tx/Rx<br>MT: Tx (only when the DU of the upper-level node knows in advance that the DU of IAB is in the Tx state), or Rx (only when the DU of the upper-level node knows in advance that the DU of IAB is in the Rx state)<br>When the DU resource is INA,<br>DU: Null<br>MT: Tx/Rx |
| NA | DU: Null<br>MT: Rx | DU: Null<br>MT: Tx | DU: Null<br>MT: Tx/Rx |

Meanings of various identifiers in the foregoing Table 1 and Table 2 are as follows:

"MT: Tx" indicates that the MT should perform transmission after being scheduled.

"DU: Tx" indicates that the DU is capable of transmission.

"MT: Rx" indicates that the MT is capable of reception (if a signal needs to be received).

"DU: Rx" indicates that the DU can schedule uplink transmission of the lower-level node.

"MT: Tx/Rx" indicates that the MT should perform transmission or reception after being scheduled, but the transmission and reception do not occur simultaneously.

"DU: Tx/Rx" indicates that the DU can perform transmission or receive transmission from the lower-level node, but the transmission and reception do not occur simultaneously.

"IA" indicates that the DU resource is explicitly or implicitly indicated as available.

"INA" indicates that the DU resource is explicitly or implicitly indicated as unavailable.

"MT: Null" indicates that the MT does not perform transmission and does not need to have a receiving capability.

"DU: Null" indicates that the DU does not perform transmission and does not receive transmission from the lower-level node.

This application mainly considers the TDM scenario, but the solution of this application may also be extended to the SDM scenario, a frequency division multiplexing (FDM) scenario, a full duplex scenario, or the like. In the TDM scenario, the MT resources corresponding to the hard resources of the DU are unavailable.

Specifically, on resources that are unavailable for the MT (for example, MT resources corresponding to slots 1, 6, 7, and 8 in FIG. 5(a) and FIG. 5(b)):

(1) The MT does not expect the upper-level node to schedule the MT on these resources.

(2) The MT does not receive or transmit a reference signal on these resources.

(3) The MT does not monitor a physical downlink control channel (PDCCH) on these resources, that is, if a search space overlaps these resources, the MT of the JAB node abandons monitoring on the overlapped search space.

It should be understood that, in addition to the unavailable resources of the MT corresponding to the hard resources of the DU, the MT may also have other unavailable resources.

After the semi-static configuration is completed, the upper-level node continues to dynamically indicate the availability of soft resources of the DU resources of the JAB node to the JAB node by using dynamic signaling (for example, downlink control information (DCI)). For example, the upper-level node indicates the availability of the soft resources of the JAB node by using dedicated DCI or a dedicated DCI field. For ease of description, information included in the dynamic signaling is referred to as indication information. The dedicated DCI or the dedicated DCI field may be collectively referred to as indication DCI.

The dynamic indication may be implemented in a plurality of manners.

In one implementation, the dynamic indication may be performed in an explicit indication manner.

For example, the upper-level node directly indicates the availability of the soft resources of the DU resources of the JAB node, and may also indicate the transmission directions of some (for example, the F type) soft resources at the same time (for example, DU resources corresponding to slots 4 and 5 in FIG. 5(a) and FIG. 5(b)).

In another implementation, the dynamic indication may be performed in an implicit indication manner.

For example, the upper-level node indicates whether the MT resources (for example, available resources of the MT) of the JAB node are released (or available), and the JAB node determines the availability of the soft resources of the DU resources of the JAB node based on an indication of the MT resources from the upper-level node.

When hard resources are configured for the DU of the JAB node, the JAB node usually performs complete transmission in slots configured as hard resources. The complete transmission means that the JAB node considers that all symbols in the slots configured as hard resources are available. In addition, the hard resources of the JAB node may be considered as resources that are always available. For a hard resource of the DU, the JAB node can always communicate with the lower-level node on the hard resource, regardless of a scheduling configuration of the MT.

In one implementation, some periodic signals of the DU of the JAB node, including but not limited to periodic CSI-RSs and SRSs, are configured by the donor node and notified to the UE or the lower-level node of the JAB node by using RRC signaling. In this case, the periodic signals configured by the donor node for the JAB node should be located in the hard resources of the DU of the JAB node.

FIG. 4 is a schematic diagram of a relationship between an H/S resource of the DU and an available or unavailable resource of the MT according to an embodiment of this application. In FIG. 4, a symbol is used as an example. The H symbol represents a hard resource, the S symbol represents a soft resource, A represents an available resource, and NA represents an unavailable resource. It should be understood that FIG. 4 is merely an example and that the symbol may alternatively be a slot or a subframe.

FIG. 4 shows seven symbols. A symbol 0 and a symbol 6 are hard symbols of the DU, and are always available for the DU. In FIG. 4, assuming that resource allocation is performed between the MT and the DU of the JAB node in TDM mode, corresponding symbols 0 and 6 of the MT are unavailable symbols. Symbols 1 to 5 in the figure are soft symbols of the DU. It can be learned from Table 1 that corresponding symbols of the MT should be available symbols.

It can be learned from FIG. 2 and FIG. 4 that if a slot, a subframe, or a symbol is configured as a hard resource on the DU of the JAB node, a corresponding symbol on the MT is unavailable. Further, if a resource on the DU of the JAB node is configured as a hard resource, a resource that is on the MT and overlaps the hard resource is unavailable. The resource herein may be a slot, a subframe, or a symbol. This is not described again subsequently.

However, the MT and the DU of the JAB node have different frame boundaries or symbol boundaries when transmitting or receiving data. As a result, the MT resources and the DU resources of the JAB node are not aligned in time domain. Generally, a frame timing (or symbol timing) offset between the MT and the DU of the JAB node is caused by a transmission delay between the JAB node and the upper-level node. In addition, some other factors, for example, an offset $T_g$ between the time of receiving an uplink frame and the time of transmitting a downlink frame by the DU of the IAB node, also cause a frame timing offset.

When determining available symbols of the MT of the IAB node, the IAB node and the upper-level node not only require resource configuration information of the DU of the IAB node, but also require information about the frame timing (or symbol timing) offset between the MT and the DU of the IAB node.

When the IAB node performs a transition between data transmission on the DU and data transmission on the MT, at a transition boundary, one or more symbols on the MT of the IAB node cannot be used for data transmission. To improve spectral efficiency, the quantity of unavailable resources on the MT needs to be minimized. How to determine which resources are unavailable or available is a problem to be addressed in this application.

Generally, the IAB node does not communicate with the upper-level node on an unavailable symbol of the MT. Specifically, if some symbols of a resource for signals configured by a higher layer, for example, for PDCCH detection, periodic CSI-RS reception, and periodic SRS transmission, are unavailable symbols of the MT, the MT does not transmit or receive the signals. In addition, for a dynamic scheduling or indication signal, the MT of the IAB node does not expect the signal to be located on an unavailable symbol of the MT. The dynamic scheduling or indication signal herein includes but is not limited to a PDSCH, a DMRS of a PDSCH, a PUSCH, a DMRS of a PUSCH, or a PUCCH for HARQ-ACK feedback. Alternatively, if resources occupied by a dynamically scheduled data channel such as a PDSCH or a PUSCH include unavailable symbols, the IAB node and the upper-level node perform rate matching for unavailable symbols during transmission of the channel.

In the foregoing technical problem, the quantity of available or unavailable resources on the MT of the IAB node may vary in different scenarios. In the embodiments of this application, a possible scenario and a method for calculating a time difference are described.

FIG. 5(a) and FIG. 5(b) show a scenario in which the MT of the IAB node performs downlink reception and the DU performs downlink transmission. In the figure, DL represents downlink, and this is not described again. Two possible cases are included. In FIG. 5(a), downlink transmission is performed on a hard symbol 501 on the DU of the IAB node, while downlink reception is performed on symbols 511 and 512 on the MT. In FIG. 5(b), downlink reception is performed on symbols 513 and 514 on the MT of the IAB node, while downlink transmission is performed on a hard symbol 502 on the DU. It should be understood that only a symbol is used as an example in FIG. 5(a) and FIG. 5(b). The symbol may alternatively be a subframe or a slot. This is not described again subsequently.

In FIG. 5(a), because the hard symbol 501 of the DU of the JAB node is in a transmitting state, but the symbol 511 and the symbol 512 of the MT of the IAB node are in a receiving state, when the JAB node transitions from a DU transmitting state to an MT receiving state, a power amplifier needs to transition from a transmitting state to a receiving state. This transition requires a transition time, denoted as $T_{TR}$. There is a time offset between a time of receiving a downlink frame by the MT of the JAB node and a time of transmitting a downlink frame by the DU, and the time offset is denoted as $\Delta_{DD}$. A first letter of the subscript indicates a transmission direction of the MT, and a second letter of the subscript indicates a transmission direction of the DU. This is also applicable to the following description and is not described again. Assuming that in a TDD system, downlink transmission of the upper-level node is generally synchronous with downlink transmission of the JAB node, $\Delta_{DD}$ is generally caused by a propagation delay from the upper-level node to the JAB node. However, in practice, due to non-ideal timing, $\Delta_{DD}$ is generally not strictly equal to the propagation delay.

Similarly, in FIG. 5(b), because the symbols 513 and 514 on the MT of the JAB node are in a receiving state, but the hard symbol 502 on the DU of the JAB node is in a transmitting state, when the JAB node transitions from the MT receiving state to the DU transmitting state, the power amplifier needs to transition from the receiving state to the transmitting state. This transition requires a certain transition time, denoted as $T_{RT}$.

As can be learned from FIG. 5(b), the symbol 514 of the MT of the JAB node is extended after the hard symbol 502 of the DU, and therefore, the symbol 514 cannot be used for downlink transmission by the MT. Because $\Delta_{DD}$ is mainly caused by the propagation delay, the power amplifier of the JAB node requires a transition time from transmission by the DU to reception by the MT or from reception by the MT to transmission by the DU, corresponding to $T_{TR}$ and $T_{RT}$ respectively.

Determining whether one or more symbols after the hard symbol 501 of the DU of the JAB node are available depends on a relationship between $\Delta_{DD}$ and $T_{TR}$. Assuming that an end time of the hard symbol 501 of the DU of the JAB node is $t_1$ and that a start time of each symbol on the MT, for example, the symbol 511 or the symbol 512, is $t_3$, determining whether the resource on the MT is available depends on a relationship between $t_3-t_1$ and $T_{TR}$. When $t_3-t_1 \geq T_{TR}$ (or $t_3-t_1 > T_{TR}$), the resource whose start time is $t_3$ on the MT is available. When $t_3-t_1 < T_{TR}$ (or $t_3-t_1 \leq T_{TR}$), the resource whose start time is $t_3$ on the MT is unavailable.

It should be understood that a value of $t_3-t_1$ may be obtained based on $\Delta_{DD}$. For example, when indexes of the symbol 501 and the symbol 511 are continuous, for example, are i and i+1 respectively, and lengths of the two symbols are the same, $\Delta_{DD}=t_3-t_1$.

For example, when $\Delta_{DD} > T_{TR}$, the symbol 511 may be used for downlink transmission on the MT. If $\Delta_{DD} < T_{TR}$, the symbol 511 is unavailable. If $\Delta_{DD}+T_s < T_{TR}$, the second symbol 512 is unavailable, where $T_s$ is a symbol length, a value of $T_s$ depends on a waveform parameter, and $\Delta_{DD}+T_s$ is an interval from the end time of the symbol 501 to the start time of the symbol 512.

Determining whether one or more resources before the hard symbol 502 of the DU of the JAB node are available also depends on a relationship between $\Delta_{DD}$ and $T_{TR}$. Assuming that a start time of the hard symbol 502 of the DU of the JAB node is $t_2$ and that an end time of each symbol on the MT, for example, the symbol 513 or the symbol 514, is $t_4$, determining whether the resource on the MT is available depends on a relationship between $t_2-t_4$ and $T_{RT}$. When $t_2-t_4 \geq T_{RT}$ (or $t_2-t_4 > T_{RT}$), the resource whose end time is $t_4$ on the MT is available. When $t_2-t_4 < T_{RT}$ (or $t_2-t_4 \leq T_{RT}$), the resource whose end time is $t_4$ on the MT is unavailable.

For example, the end time of the symbol 514 in FIG. 5(b) is later than the start time of the hard symbol 502 of the DU of the JAB node, and therefore, $t_2-t_4 < 0$. Therefore, the symbol 514 cannot be used for transmission by the MT. The foregoing assumes that $T_{TR}$ and $T_{RT}$ are both greater than 0.

It should be understood that a value of $t_2-t_4$ may be obtained based on $\Delta_{DD}$.

FIG. 6(a) and FIG. 6(b) show a scenario in which the MT of the JAB node performs uplink transmission and the DU performs downlink transmission. In FIG. 6(a) and FIG. 6(b), UL represents uplink (uplink). A difference from FIG. 5(a) and FIG. 5(b) lies in that a resource of the MT of the JAB node is advanced, where a time advance is denoted as $\Delta_{UD}$, indicating a time difference between an uplink transmit frame of the MT of the JAB node and a downlink transmit frame of the DU. In the scenario shown in FIG. 6(a) and FIG. 6(b), because both the MT and the DU are in the transmitting state, no transition of the power amplifier is required, and there is no transition time. In the TDM scenario, only when an uplink symbol of the MT directly overlaps a downlink hard symbol of the DU, are the symbols considered as unavailable resources. However, in the SDM scenario, even if two symbols overlap each other, they may be considered as available resources.

Similarly, in the TDM scenario, assuming that an end time of a hard symbol 601 of the DU of the JAB node in FIG. 6(a) is $t_1$ and that a start time of each symbol on the MT, for example, a symbol 611 or a symbol 612, is $t_3$, determining whether the resource on the MT is available depends on $t_3-t_1$. When $t_3-t_1 \geq 0$ (or $t_3-t_1 > 0$), the resource whose start time is $t_3$ on the MT is available. When $t_3-t_1 < 0$ (or $t_3-t_1 \leq 0$), the resource whose start time is $t_3$ on the MT is unavailable.

It should be understood that a value of $t_3-t_1$ may be obtained based on $\Delta_{UD}$.

When a resource before a hard symbol 602 of the DU is used for uplink transmission on the MT, because uplink transmission is advanced, generally, $\Delta_{UD} > 0$, and the resource is an available resource.

FIG. 7(a) and FIG. 7(b) show a scenario in which the MT of the JAB node performs downlink reception and the DU performs uplink reception. Because both the MT and the DU of the JAB node are in the receiving state, there is no power amplifier transition time. In the TDM scenario, only when a downlink resource of the MT directly overlaps an uplink hard symbol (or resource) of the DU, are the resources considered as unavailable resources. However, in the SDM scenario, even if two resources overlap each other, they may be considered as available resources.

Similarly to FIG. 5(a) and FIG. 5(b), because the MT of the JAB node performs downlink reception, there is a time delay between a downlink receive frame of the MT and an uplink receive frame of the DU, and the time delay is denoted as $\Delta_{DU}$.

Assuming that an end time of a hard symbol 701 of the DU of the JAB node in FIG. 7(a) is $t_1$ and that a start time of each symbol on the MT, for example, a symbol 711 or a symbol 712, is $t_3$, determining whether the resource on the MT is available depends on $t_3-t_1$. When $t_3-t_1 \geq 0$ (or $t_3-t_1 > 0$), the resource whose start time is $t_3$ on the MT is available. When $t_3-t_1 < 0$ (or $t_3-t_1 \leq 0$), the resource whose start time is $t_3$ on the MT is unavailable.

Assuming that a start time of a hard symbol 702 of the DU of the JAB node is $t_2$ and that an end time of each symbol on the MT, for example, a symbol 713 or a symbol 714, is $t_4$, determining whether the resource on the MT is available depends on $t_2-t_4$. When $t_2-t_4 \geq 0$ or $t_2-t_4 > 0$), the resource whose end time is $t_4$ on the MT is available. When $t_2-t_4 < 0$ (or $t_2-t_4 \geq 0$), the resource whose end time is $t_4$ on the MT is unavailable.

Herein, both $t_3-t_1$ and $t_2-t_4$ may be obtained based on $\Delta_{DU}$.

FIG. 8(a) and FIG. 8(b) show a scenario in which the MT of the JAB node performs uplink transmission and the DU performs uplink reception. In FIG. 8(a), the DU performs uplink reception, and the MT performs uplink transmission. In FIG. 8(b), the MT performs uplink transmission, and the DU performs uplink reception. For a transition between the uplink transmission by the MT and the uplink reception by the DU, a transition interval is mainly caused by a power amplifier turn-on time and a power amplifier turn-off time required for the uplink transmission by the MT. Therefore, in FIG. 8(a), the transition interval is placed before or after an uplink symbol of the MT.

In FIG. 8(a), because a hard symbol 801 of the DU of the JAB node is in a receiving state, but a symbol 811 and a symbol 812 of the MT of the JAB node are in a transmitting state, when the JAB node transitions from a DU receiving state to an MT transmitting state, the power amplifier needs to transition from the receiving state to the transmitting state. This transition requires a certain transition time, denoted as $T_{RT}$.

Herein, a time offset between an uplink transmit frame of the MT and an uplink receive frame of the DU is denoted as $\Delta_{DU}$. In FIG. 8(a), it is assumed that the uplink transmit frame of the MT is ahead of the uplink receive frame of the DU.

Similarly, in FIG. 8(b), because a symbol 813 and a symbol 814 on the MT of the JAB node are in a transmitting state, but a hard symbol 802 on the DU of the JAB node is in a receiving state, when the JAB node transitions from the MT transmitting state to the DU receiving state, the power amplifier needs to transition from the transmitting state to the receiving state. This transition requires a transition time, denoted as $T_{TR}$.

Assuming that an end time of the hard symbol 801 of the DU of the JAB node in FIG. 8(a) is $t_1$ and that a start time of each symbol on the MT, for example, the symbol 811 or the symbol 812, is $t_3$, determining whether the resource on the MT is available depends on a relationship between $t_3-t_1$ and $T_{RT}$. When $t_3-t_1 \geq T_{RT}$ (or $t_3-t_1 > T_{RT}$), the resource whose start time is $t_3$ on the MT is available. When $t_3-t_1 < T_{RT}$ (or $t_3-t_1 \leq T_{RT}$), the resource whose start time is $t_3$ on the MT is unavailable.

Similarly, assuming that a start time of the hard symbol 802 of the DU of the JAB node is $t_2$ and that an end time of each symbol on the MT, for example, the symbol 813 or the symbol 814, is $t_4$, determining whether the resource on the MT is available depends on a relationship between $t_2-t_4$ and $T_{TR}$. When $t_2-t_4 \geq T_{TR}$ (or $t_2-t_4 > T_{TR}$), the resource whose end time is $t_4$ on the MT is available. When $t_2-t_4 < T_{TR}$ (or $t_2-t_4 \geq T_{TR}$), the resource whose end time is $t_4$ on the MT is unavailable.

Herein, both $t_3-t_1$ and $t_2-t_4$ may be obtained based on $\Delta_{UU}$.

It can be learned from the foregoing embodiments in FIG. 5(a) to FIG. 8(b) that, in different scenarios, when a relationship is satisfied between a resource on the MT of the IAB node and a hard resource on the DU, the availability of the MT resource on the IAB node may be determined.

For ease of description, in the embodiments of this application, a first resource set is defined. The first resource set is between a first hard resource set and a second hard resource set, and the first hard resource set and the second hard resource set are consecutive hard resources. The consecutive hard resources mean that there is no other hard resource between the first hard resource set and the second hard resource set. It should be understood that the resource herein may be a symbol, a slot, or a subframe. This is not described again subsequently. The following mainly uses the symbol as an example for description. The first resource set may be a part or all of resources between the first hard resource set and the second hard resource. When the first resource set is used for transmission between the MT and the upper-level node, the transmission may be uplink transmission or downlink transmission. When the first hard resource set and the second hard resource set are used for transmission between the DU of the IAB node and the lower-level node, the transmission may be uplink transmission or downlink transmission. Whether the first resource set, the first hard resource set, or the second hard resource set is specifically used for uplink transmission or downlink transmission depends on a configuration or scheduling.

Specifically, a first node generally determines a first threshold x and a second threshold y, and when $t_3-t_1 \geq x$ and $t_2-t_4 \geq y$, the first node determines that a symbol in the first resource set is available, where $t_1$ is an end time of a last symbol in the first hard resource set, $t_2$ is a start time of a first symbol in the second hard resource set, $t_3$ is a start time of the symbol, and $t_4$ is an end time of the symbol. The first node is an IAB node.

In this application, a start time and an end time of a symbol may be a start time and an end time of transmitting the symbol, or may be a start time and an end time of receiving the symbol. It should be understood that the start time and the end time of receiving the symbol may be a start time and an end time of a receive window of the symbol and that the start time of receiving the symbol may not include a cyclic prefix (CP) of an OFDM symbol.

Values of the first threshold x and the second threshold y are different in different scenarios. Specifically, when a transmission direction of the last symbol in the first hard resource set is downlink transmission, and a transmission direction of the first resource set is downlink transmission, the first threshold $x=T_{TR}$; or when a transmission direction of the last symbol in the first hard resource set is downlink transmission, and a transmission direction of the first resource set is uplink transmission, x=0; or when a transmission direction of the last symbol in the first hard resource set is uplink transmission, and a transmission direction of the first resource set is downlink transmission, x=0; or when a transmission direction of the last symbol in the first hard resource set is uplink transmission, and a transmission direction of the first resource set is uplink transmission, $x=T_{RT}$; or when a transmission direction of the first symbol in the second hard resource set is downlink transmission, and a transmission direction of the first resource set is downlink transmission, $y=T_{RT}$; or when a transmission direction of the first symbol in the second hard resource set is downlink transmission, and a transmission direction of the first resource set is uplink transmission, y=0; or when a transmission direction of the first symbol in the second hard resource set is uplink transmission, and a transmission direction of the first resource set is downlink transmission, y=0; or when a transmission direction of the first symbol in the second hard resource set is uplink transmission, and a transmission direction of the first resource set is uplink transmission, $y=T_{TR}$, where $T_{RT}$ is a transition time from reception by the MT to transmission by the DU or a transition time from reception by the DU to transmission by the MT of the first node; and $T_{TR}$ is a transition time from transmission by the MT to reception by the DU or a transition time from transmission by the DU to reception by the MT of the first node.

Figure 9:
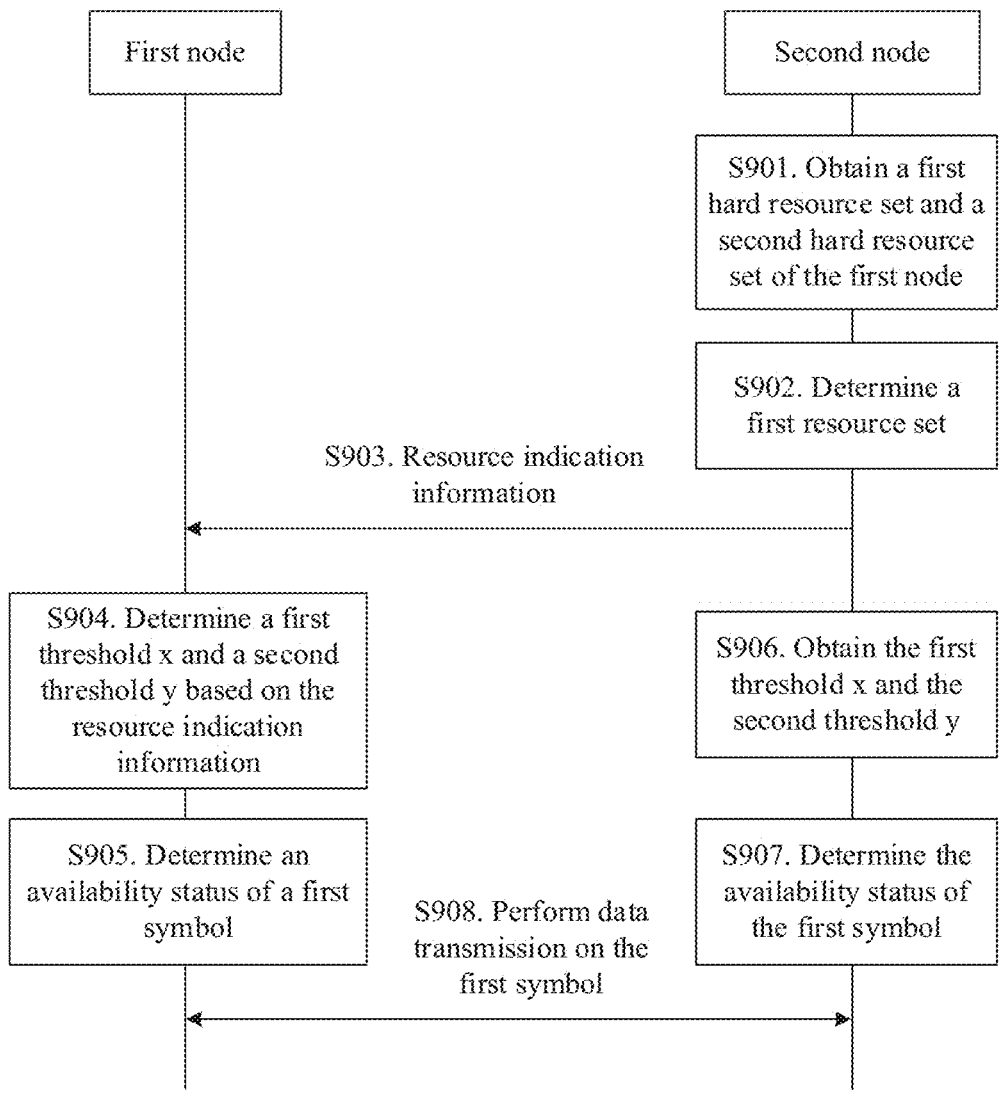
FIG. 9 shows a flowchart of a method for determining a resource according to an embodiment of this application.

A resource of the JAB node on a backhaul link may be determined by setting parameters in the foregoing scenarios. FIG. 9 is a method for determining a resource according to an embodiment of this application. It should be understood that steps in FIG. 9 do not represent an execution sequence, and do not mean that all steps are mandatory.

To maintain consistency of transmission resources on a backhaul link between an JAB node and an upper-level node, resources used for the backhaul link and determined by the JAB node and the upper-level node are the same. In FIG. 9, a first node is an JAB node, a second node is an upper-level node of the JAB node, and the second node may be another JAB node or may be a donor base station. Specific steps are as follows:

S901. The second node obtains a first hard resource set and a second hard resource set of the first node.

The second node may obtain the first hard resource set and the second hard resource set of the first node by using a donor base station. For example, the first hard resource set and the second hard resource set are obtained by using RRC signaling or an F1-AP interface.

The second node may further obtain the first hard resource set and the second hard resource set directly by using the first node. For example, the second node may obtain the first hard resource set and the second hard resource set of the first node by transmitting a resource configuration request to the first node. Specifically, the first hard resource set and the second hard resource set may be obtained by using media access control (MAC) layer signaling (CE), that is, a MAC CE. After receiving the resource configuration request of the second node, the first node transmits a resource configuration response to the second node, where the resource configuration response includes the first hard resource set and the second hard resource set.

In a possible implementation, the second node may further obtain soft resource configuration information of the first node, and obtain the first hard resource set and the second hard resource set by using the soft configuration information. It can be learned from the foregoing embodiment that the second node may determine, based on hard resources and/or soft resources of the first node, an available resource and/or an unavailable resource on an MT of the first node.

The first hard resource set may be one or more symbols, slots, or subframes. Resources in the first hard resource set have the same transmission direction, that is, used for uplink transmission or downlink transmission on an access link by a DU of the first node. Likewise, the second hard resource set may be one or more symbols, slots, or subframes. Resources in the second hard resource set have the same transmission direction. Therefore, that the second node obtains a first hard resource set and a second hard resource set of the first node includes obtaining information about the transmission directions of the first hard resource set and the second hard resource set.

S902. The second node determines a first resource set.

The first resource set is located between the first hard resource set and the second hard resource set. The first resource set is a part or all of resources between the first hard resource set and the second hard resource set. The first resource set may be one or more symbols, slots, or subframes. All resources in the first resource set have the same transmission direction. The first resource set is used to perform data transmission between the MT of the first node and a DU of the second node. It should be understood that the data transmission in this application includes transmission of user data and control signaling. The following mainly uses the symbol as an example for description.

Resources between the first hard resource set and the second hard resource set may be divided into one or more first resource sets. Each first resource set may have its own transmission direction. Specifically, the transmission direction is dynamically indicated by the second node according to a scheduling requirement. Therefore, after determining the first resource set, the second node notifies the first node of the first resource set by using resource indication information. The resource indication information may be indicated by using a PDCCH. Specifically, DCI on the PDCCH carries the resource indication information. The PDCCH may include resource indication information of one or more first resource sets.

S903. The second node transmits resource indication information to the first node.

The resource indication information may be carried by higher layer signaling or layer 1 signaling. For example, a resource indication is performed by using DCI. Specifically, the resource indication information includes one or more pieces of the following information: the start position of a resource, the quantity of resources, the transmission direction, and frequency domain information. The frequency domain information may include a start position in frequency domain, for example, a number of a resource block (RB) and/or a quantity of RBs.

S904. The first node determines a first threshold x and a second threshold y based on the resource indication information.

The first threshold and the second threshold depend on the transmission direction of the first resource set, and further depend on the transmission directions of the first hard resource set and the second hard resource set. A time sequence relationship between resources that is caused by different transmission directions of the first hard resource set and the first resource set is described in FIG. 5(a) to FIG. 8(b) in the foregoing embodiments, and details are not described again.

The first threshold x is a minimum limit satisfied by a time difference between a start time of a symbol and an end time of a last symbol in the first hard resource set. The second threshold y is a minimum limit satisfied by a time difference between an end time of the symbol and a start time of a first symbol in the second hard resource set. The symbol is a symbol whose availability status needs to be determined in the first resource set.

Specifically, when a transmission direction of the last symbol in the first hard resource set is downlink transmission, and the transmission direction of the first resource set is downlink transmission, the first threshold $x=T_{TR}$; or when a transmission direction of the last symbol in the first hard resource set is downlink transmission, and the transmission direction of the first resource set is uplink transmission, x=0; or when a transmission direction of the last symbol in the first hard resource set is uplink transmission, and the transmission direction of the first resource set is downlink transmission, x=0; or when a transmission direction of the last symbol in the first hard resource set is uplink transmission, and the transmission direction of the first resource set is uplink transmission, $x=T_{RT}$; or when a transmission direction of the first symbol in the second hard resource set is downlink transmission, and the transmission direction of the first resource set is downlink transmission, $y=T_{RT}$; or when a transmission direction of the first symbol in the second hard resource set is downlink transmission, and the transmission direction of the first resource set is uplink transmission, $y=0$; or when a transmission direction of the first symbol in the second hard resource set is uplink transmission, and the transmission direction of the first resource set is downlink transmission, $y=0$; or when a transmission direction of the first symbol in the second hard resource set is uplink transmission, and the transmission direction of the first resource set is uplink transmission, $y=T_{TR}$, where $T_{RT}$ is a receive-transmit transition time of the first node, and $T_{TR}$ is a transmit-receive transition time of the first node.

In a possible implementation, the first node may determine the first threshold x and the second threshold y by querying a table. Specifically, the first threshold x and the second threshold y may be determined by using the following Table 3.

TABLE 3

Correspondence between resource transmission direction and threshold

|  |  | MT | |
| --- | --- | --- | --- |
|  |  | UL | DL |
| DU | UL | $x = T_{RT}$<br>$y = T_{TR}$ | $x = 0$<br>$y = 0$ |
|  | DL | $x = 0$<br>$y = 0$ | $x = T_{TR}$<br>$y = T_{RT}$ |

In Table 3, DU represents a hard resource of the DU of the first node, and MT represents a first resource of the MT of the first node. For the DU, UL indicates that the transmission direction is uplink reception on the access link, and DL indicates that the transmission direction is downlink transmission on the access link. For the MT, UL indicates that the transmission direction is uplink transmission on the backhaul link, and DL indicates that the transmission direction is downlink reception on the backhaul link.

The first threshold x and the second threshold y may be determined by querying the table.

In a possible implementation, the first threshold x and the second threshold y may be defined by a protocol. For example, the first threshold x and the second threshold y may be defined as the same predefined value, or may be separately defined as different predefined values. Predefined values may be separately defined for the first threshold x and the second threshold y in various scenarios in the foregoing Table 3. For example, in a scenario of uplink transmission by the DU and downlink transmission by the MT, the first threshold x and the second threshold y may alternatively not be 0. The specific definition depends on a protocol definition or other factors, such as an equipment implementation of a manufacturer. This application does not limit a specific implementation.

In a possible implementation, the first threshold x and the second threshold y are reported by the first node to the second node.

S905. The first node determines an availability status of the symbol.

It is assumed that $t_1$ is the end time of the last symbol in the first hard resource set, and $t_2$ is the start time of the first symbol in the second hard resource set, and $t_3$ is the start time of the symbol, and $t_4$ is the end time of the symbol. When $t_3-t_1 \geq x$, and $t_2-t_4 \geq y$, the first node determines that the symbol in the first resource set is available.

Herein, a start time and an end time of a symbol may be a start time and an end time of transmitting the symbol, or may be a start time and an end time of receiving the symbol. It should be understood that the start time and the end time of receiving the symbol may be a start time and an end time of a receive window of the symbol and that the start time of receiving the symbol may not include a cyclic prefix (CP) of an OFDM symbol.

Because the first resource set may include a plurality of symbols, generally, an available symbol set in the first resource set may be determined after a first available symbol and a last available symbol in the first resource set are found. The symbol is a symbol whose availability needs to be determined in the first resource set. The first node may determine an availability status of each symbol in the first resource set by using the foregoing method. The availability status includes "available" and "unavailable". A symbol in an available state means that the symbol can be used for data transmission between the first node and the second node, and a symbol in an unavailable state means that the symbol cannot be used for data transmission between the first node and the second node.

When the first resource set includes all of the resources between the first hard resource set and the second hard resource set, it can be learned from the foregoing embodiments in FIG. 5(a) to FIG. 8(b) that one or more symbols in the first resource set that are located after the first hard resource set in time domain and one or more symbols in the first resource set that are located before the second resource set in time domain need to be considered.

If the first resource set includes a part of the resources between the first hard resource set and the second hard resource set, and the resources are located after the first hard resource set, generally, only one or more symbols in the first resource set that are located after the first hard resource set need to be considered.

If the first resource set includes a part of the resources between the first hard resource set and the second hard resource set, and the resources are located before the second hard resource set, generally, only one or more symbols in the first resource set that are located before the second hard resource set need to be considered.

For a specific method for determining the availability status of the symbol, refer to embodiments shown in FIG. 10(a), FIG. 10(b), FIG. 11(a), and FIG. 11(b).

In a possible implementation, the last symbol in the first hard resource set or the first symbol in the second hard resource set is a flexible symbol, that is, a symbol whose transmission direction is not determined. In a possible implementation, the first node may separately assume that the flexible symbol is an uplink symbol or a downlink symbol, and separately determine the availability of the symbol based on the two assumptions. The symbol is determined as an available symbol only when the symbol is an available symbol in both of the assumptions. In another possible implementation, the protocol specifies an assumption of the flexible symbol by the first node or the second node. For example, the flexible symbol is always assumed to be an uplink symbol or a downlink symbol, and the first node determines the availability of the symbol based on the assumption.

S906. The second node obtains the first threshold x and the second threshold y.

Because the first threshold x and the second threshold y may be related to a power amplifier receive/transmit transition time between the DU and the MT of the first node, the second node needs to obtain the power amplifier receive/transmit transition time between the DU and the MT of the first node, to determine the first threshold x and the second threshold y. The power amplifier receive/transmit transition time between the DU and the MT of the first node includes a receive-transmit transition time or a transmit-receive transition time, as described above. Details are not described again.

In a possible implementation, the second node may obtain, from the donor base station, the power amplifier receive/transmit transition time between the DU and the MT of the first node, for example, obtain the power amplifier receive/transmit transition time between the DU and the MT of the first node by using the RRC protocol or an F1-AP interface message.

In a possible implementation, alternatively, the second node may directly request, by using a MAC CE, the first node to transmit the power amplifier receive/transmit transition time between the DU and the MT of the first node.

In a possible implementation, the first threshold x and the second threshold y may be defined by the protocol. Details are described above, and are not described again.

S907. The second node determines the availability status of the symbol.

Step S907 is the same as step S905. For a specific method for determining the availability status of the symbol, refer to the embodiments shown in FIG. 10 (a), FIG. 10(b), FIG. 11(a), and FIG. 11(b).

Figures 10A, 10B:
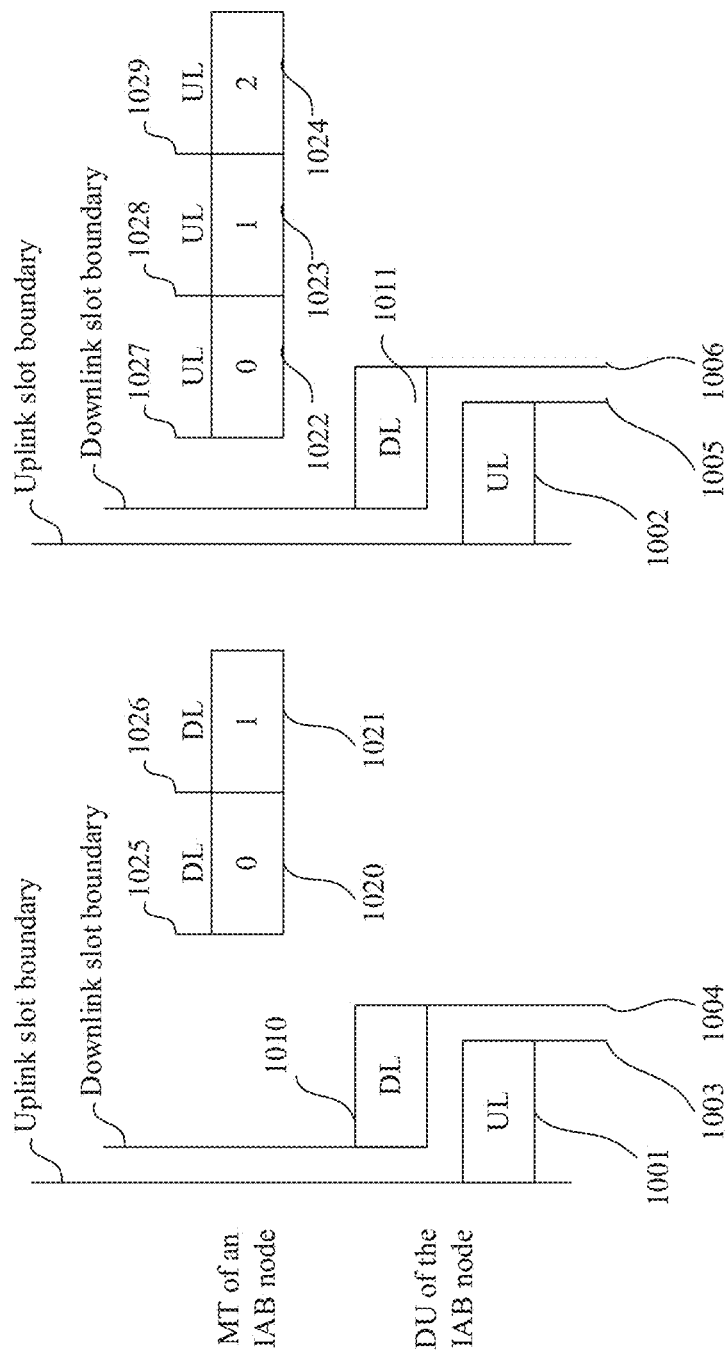
FIG. 10(a) and FIG. 10(b) show a schematic diagram for determining an availability status of one or more symbols in a first resource set after a first hard resource set according to an embodiment of this application.

FIG. 10 (a) and FIG. 10(b) are a schematic diagram for determining an availability status of one or more symbols in the first resource set after the first hard resource set. Determining the availability status of the one or more symbols after the first hard resource set mainly includes two scenarios, that is, a scenario of uplink transmission of the first resource set and a scenario of downlink transmission of the first resource set. FIG. 10(a) is the scenario of downlink transmission of the first resource set, and FIG. 10(b) is the scenario of uplink transmission of the first resource set.

In FIG. 10(a), 1010 is a downlink transmission resource of the DU of the JAB node, and 1001 is an uplink transmission resource of the DU. The transmission resource may be a symbol, a slot, or a subframe. Generally, an uplink slot boundary is advanced relative to a downlink slot boundary. 1003 is an end time of the uplink transmission resource of the DU, and 1004 is an end time of the downlink transmission resource of the DU. FIG. 10(a) shows two resources 1020 and 1021 of the MT of the JAB node. It is assumed that numbers of the two resources are 0 and 1 respectively, where a start time of the resource 0 is 1025, and a start time of the resource 1 is 1026. 1025 is a possible time of receiving the resource 0, and 1026 is a possible time of receiving the resource 1. 1003 is an actual end time of 1001, and 1004 is an actual end time of 1010. Because 1001 and 1010 are hard resources, the end time of 1001 and the end time of 1010 are determined.

Therefore, in FIG. 10(a), whether the resources 0 and 1 of the MT are available needs to be determined based on time differences between the resources 0 and 1 and 1003 or 1004. It can be learned from the foregoing embodiment that in a case of uplink reception of 1001 on the DU of the JAB node, no power amplifier receive/transmit transition is required, but the JAB node has a delay in reception on the MT due to a propagation delay. Therefore, a time difference between 1025 and 1003 is greater than 0, and the symbol in the first resource set is always available.

In a case of downlink transmission of 1010 on the DU of the JAB node, the power amplifier needs to transition from a transmitting state on the access link of the JAB node to a receiving state on the backhaul link, and a transition delay is required, as described above. Details are not described again. In this case, a time difference between 1025 and 1004 needs to be calculated, so that the availability status of the first symbol is determined. For the resource 1 of the MT of the JAB node, the case is similar.

In FIG. 10(a), because the first resource set is used for downlink transmission, a position of the resource 0 of the MT of the JAB node may be determined based on a downlink slot or frame timing of the DU of the JAB node. Because an end position of the resource 1010 of the DU of the JAB node is 1004, theoretically, an arrival time of the resource 0 of the JAB node may be determined based on the propagation delay, and the time difference between 1025 and 1004 is determined. However, in practice, the time difference between 1025 and 1004 is not necessarily strictly equal to the propagation delay between the first node and the second node due to non-ideal timing.

Generally, the time difference between 1025 and 1004 is determined based on $\Delta_{DD}$. When a downlink transmit timing of the DU of the JAB node is configured by the upper-level node by using an OTA (over the air) method, assuming that a timing advance configured by the upper-level node for the JAB node is TA and that a timing offset is $T_{delta}$, the following may be obtained: $\Delta_{DD}=TA/2+T_{delta}$. TA is a timing advance used when the MT of the JAB node performs uplink transmission, and is generally configured by the upper-level node, and has the same meaning as a timing advance used for uplink transmission of UE.

For example, whether the symbol 1020 is available needs to be determined based on a time difference between the start time 1025 of the symbol 1020 and the end time 1004 of the symbol 1010. Assuming that the start time of 1020 is $t_3$ and that the end time of the symbol 1010 is $t_1$, the availability status of the first symbol in the first resource set on the MT of the JAB node is determined by determining a relationship between $t_3-t_1$ and the first threshold x. If $((t_3-t_1) \geq x$ (or $(t_3-t_1)>x)$, it is determined that the resource 1020 is available. If $(t_3-t_1)<x$ (or $(t_3-t_1) \leq x)$, it is determined that the resource 1020 is unavailable. In the example, for the first symbol in the first resource set, $(t_3-t_1)=\Delta_{DD}$.

Similarly, for the resource 1021, there is an offset between the start time 1026 of the resource 1021 and the start time 1025 of the resource 1020. Using a symbol as an example, the offset of 1026 relative to 1025 is $T_s$, where $T_s$ is a length of one symbol, a value of $T_s$ depends on a waveform parameter, and the value of $T_s$ varies depending on different waveform parameters. The specific value of $T_s$ depends on a protocol definition. It should be understood that if the resource is a slot, the offset of 1026 relative to 1025 is a size of a slot, and the size of the slot also depends on a waveform parameter. Specifically, the size of the slot may be determined based on a waveform parameter defined in the protocol, and details are not described herein.

Therefore, a time difference between 1026 and 1004 in FIG. 10(a) is $T_s+\Delta_{DD}$. If $T_s+\Delta_{DD} \geq x$ (or $T_s+\Delta_{DD}>x$), it is determined that the resource 1021 is available. If $T_s+\Delta_{DD}<x$ (or $T_s+\Delta_{DD}\leq x$), it is determined that the resource 1021 is unavailable.

More generally, assuming that symbols in the first resource set in FIG. 10(a) are sequentially numbered 0, 1, . . . , and k−1, where k is an integer greater than 1, a time difference between a start time of a symbol i and 1004 is $i*T_s+\Delta_{DD}$. When $i*T_s+\Delta_{DD}\geq x$ (or $i*T_s+\Delta_{DD}>x$), it is determined that the symbol i in the first resource set is available. If $i*T_s+\Delta_{DD}<X$ (or $i*T_s+\Delta_{DD}\leq x$), it is determined that the symbol i in the first resource set is unavailable.

In FIG. 10(b), 1002 and 1011 are hard resources of the DU of the IAB node, where 1002 is an uplink resource, and 1011 is a downlink resource. Because 1002 is an uplink receive resource, the resource has a timing advance denoted as $T_g$, relative to the downlink transmit resource 1011, that is, T is a timing offset between an uplink frame and a downlink frame of the DU of the IAB node. 1005 is an end time of the uplink resource 1002, and 1006 is an end time of the downlink resource 1011. Resources 1022, 1023, and 1024 are possible transmission times in the first resource set. For example, if the resource 1022 is transmitted, a start time is 1027, and if the resource 1023 is transmitted, a start time is 1028.

Because the first resource set is used for uplink transmission, when actual transmission is performed, an advance relative to an uplink slot or subframe timing is required.

If a hard resource of the DU of the IAB node before the first resource set is used for downlink transmission, the IAB node does not need to perform a power amplifier transition from downlink transmission by the DU to uplink transmission by the MT. Therefore, if a start time of a symbol in the first resource set is later than the end time 1006 of the hard resource 1011 of the DU, the symbol may be used for transmission on the MT.

In FIG. 10(b), an advance of an uplink transmit frame of the MT relative to a downlink transmit frame of the DU is $\Delta_{UD}=TA+TA_{offset}-\Delta_{DD}$. Assuming that symbols in the first resource set in FIG. 10(b) are sequentially numbered 0, 1, . . . , and k−1, where k is an integer greater than 1, a time difference between a start time of a symbol i and 1006 is $i*T_s-\Delta_{UD}$. When $i*T_s-\Delta_{UD}\geq 0$ (or $i*T_s-\Delta_{UD}>0$), it is determined that the symbol i in the first resource set is available. If $i*T_s-\Delta_{UD}<0$ (or $i*T_s-\Delta_{UD}\leq 0$), it is determined that the symbol i in the first resource set is unavailable.

If the DU of the JAB node in FIG. 10(b) performs uplink transmission, a power amplifier transition time from uplink reception by the DU to uplink transmission by the MT is required. In this case, a time difference between an uplink receive frame of the DU of the JAB node and an uplink transmit frame of the MT is $\Delta_{UU}=TA+TA_{offset}-\Delta_{DD}-T_g$. Similarly, a time difference $i*T_s-\Delta_{UU}$ between the start time of the symbol i and 1005 may be obtained. When $i*T_s-\Delta_{UU}\geq T_{RT}$ (or $i*T_s-\Delta_{UU}>T_{RT}$), it is determined that the symbol i in the first resource set is available. If $i*T_s-\Delta_{UU}<T_{RT}$ (or $i*T_s-\Delta_{UU}\leq T_{RT}$), it is determined that the symbol i in the first resource set is unavailable.

FIG. 11(a) and FIG. 11(b) are a schematic diagram for determining an availability status of one or more symbols in the first resource set before the second hard resource set. Determining the availability status of the one or more symbols before the second hard resource set mainly includes two scenarios, that is, a scenario of uplink transmission of the first resource set and a scenario of downlink transmission of the first resource set. FIG. 11(a) is the scenario of downlink transmission of the first resource set, and FIG. 11(b) is the scenario of uplink transmission of the first resource set.

In FIG. 11(a), 1110 is a downlink transmission resource of the DU of the JAB node, and 1101 is an uplink transmission resource of the DU. The transmission resource may be a symbol, a slot, or a subframe. Generally, an uplink slot boundary is advanced relative to a downlink slot boundary, and the advance is denoted as $T_g$. 1103 is a start time of the uplink transmission resource of the DU, and 1004 is a start time of the downlink transmission resource of the DU. FIG. 11(a) shows two resources 1120 and 1121 of the MT of the JAB node. It is assumed that numbers of the two resources are k−2 and k−1 respectively, where an end time of the resource k−2 is 1124, and an end time of the resource k−1 is 1125. If the resources 1120 and 1121 are used for transmission, 1124 is an end time of the resource k−2, and 1125 is an end time of the resource k−1. Because 1101 and 1110 are hard resources, the start time of 1101 and the start time of 1110 are determined.

Therefore, in FIG. 11(a), whether the resource k−2 of the MT is available needs to be determined based on a time difference between the start time of the resource k−2 and the start time of the hard resource of the DU of the JAB node. Likewise, whether the resource k−1 of the MT is available needs to be determined based on a time difference between the start time of the resource k−1 and the start time of the hard resource of the DU of the JAB node.

It can be learned from the foregoing embodiment that in a case of uplink reception of 1101 on the DU of the JAB node, no power amplifier receive/transmit transition is required. Therefore, if an end time of a symbol on the MT of the JAB node precedes the start time of 1101, the symbol is available.

In a case of downlink transmission of 1110 on the DU of the JAB node, the power amplifier needs to transition from the receiving state on the backhaul link of the JAB node to the transmitting state on the access link, and a transition delay $T_{RT}$ is required. In this case, a time difference between 1104 and the end time of the symbol of the MT of the JAB node needs to be calculated, so that the availability status of the symbol is determined.

In FIG. 11(a), because the first resource set is used for downlink transmission, each resource on the MT, for example, the resource k−1, has a delay $\Delta_{DD}$ relative to a frame timing. The definition of $\Delta_{DD}$ is described above, and details are not described again. Assuming that a time difference between the start time of the resource 1110 of the DU of the IAB node and the end time of the symbol i of the MT is $t_{DD}$, an availability status of the symbol i in the first resource set on the MT of the JAB node may be determined by using a relationship between $t_{DD}$ and the second threshold y.

From FIG. 11(a), $t_{DD}=(k-i-1)*T_s-\Delta_{DD}$ may be determined. When $t_{DD}\geq y$ (or $t_{DD}>y$), it is determined that the resource i is available. If $t_{DD}<y$ (or $t_{DD}\leq y$), it is determined that the resource i is unavailable. When the first resource set on the MT of the JAB node is used for downlink transmission, and the hard resource on the DU is used for downlink transmission, $y=T_{RT}$. Definitions of the parameters are described above, and details are not described again.

In FIG. 11(a), if the DU of the JAB node performs uplink transmission, similarly, an availability status of the symbol i in the first resource set on the MT of the JAB node may be determined. Assuming that a time difference between the start time of the resource 1101 of the DU of the JAB node and the end time of the symbol i of the MT is $t_{DU}$, $t_{DU}=(k-i-1)*T_s-\Delta_{DD}-T_g$ can be obtained from FIG. 11(a) and the foregoing embodiment. When $t_{DU} \geq y$ (or $t_{DU} > y$), it is determined that the resource i is available. If $t_{DU} < y$ (or $t_{DU} \leq y$), it is determined that the resource i is unavailable. When the first resource set on the MT of the JAB node is used for downlink transmission, and the hard resource on the DU is used for uplink transmission, y=0. Definitions of the parameters are described above, and details are not described again.

In FIG. 11(b), resources 1102 and 1111 are hard resources of the DU of the JAB node, where 1102 is an uplink receive resource, 1111 is a downlink transmit resource, a start time of the resource 1102 is 1105, and a start time of the resource 1111 is 1106. Likewise, a boundary 1105 of 1102 is advanced relative to a boundary 1106 of 1111, and the time advance is T. The first resource set on the MT of the JAB node is used for uplink transmission, and last two resources (for example, symbols) 1122 and 1123 in the first resource set are shown in FIG. 11(b). An end time of 1122 is 1126, and an end time of 1123 is 1127.

When the hard resource of the DU of the JAB node in FIG. 11(b) is used for downlink transmission, because the first resource set on the MT is used for uplink transmission, both the MT and the DU are in the transmitting state. Therefore, no power amplifier transition time from transmission by the MT to transmission by the DU is required. Therefore, only a time difference greater than 0 (or greater than or equal to 0) needs to be satisfied between 1106 and 1127. Because the resources in the first resource set are all before the hard resource 1111 of the DU, but an uplink frame of the MT is advanced relative to a downlink transmit frame of the DU, it can be learned from the foregoing embodiment that the advance is $\Delta_{UD}=TA+TA_{offset}-\Delta_{DD}$.

When the hard resource of the DU of the JAB node in FIG. 11(b) is used for uplink reception, the JAB node transitions from uplink transmission by the MT to uplink reception by the DU, the power amplifier transitions from the transmitting state to the receiving state, and the transition time is $T_{TR}$. Similarly, an availability status of the symbol i in the first resource set on the MT of the IAB node may be determined. Assuming that a time difference between the start time of the resource 1102 of the DU of the JAB node and the end time of the symbol i of the MT is $t_{UU}$, $t_{UU}=(k-i-1)*T_s-\Delta_{UD}-T_g$ can be obtained from FIG. 11(b) and the foregoing embodiment. When $t_{UU} \geq y$ (or $t_{UU} > y$), it is determined that the resource i is available. If $t_{UU} < y$ (or $t_{UU} \leq y$), it is determined that the resource i is unavailable. $y=T_{TR}$. Definitions of the parameters are described above, and details are not described again.

It should be understood that, in the embodiments described in FIG. 10 (a), FIG. 10(b), FIG. 11(a), and FIG. 11(b), calculation methods for the first node and the second node are the same, both requiring that an availability status of a symbol in the first resource set should be determined. To enable the second node to calculate an availability status of a symbol (or resource) in the first resource set, the second node needs to obtain a power amplifier transition time between the DU and the MT of the JAB node, as described above. Details are not described again. The second node further needs to obtain a transition time $T_g$ from uplink reception to downlink transmission by the DU of the JAB node, or $\Delta_{UU}$, or $$\Delta_{UU} - \frac{TA}{2}.$$

Specifically, the first node reports $\Delta_{UU}$, or $$\Delta_{UU} - \frac{TA}{2},$$

or $T_g$ to the second node. After receiving the parameter $T_g$ reported by the first node, the second node determines $\Delta_{UU}$ by using the following formula:

$$\Delta_{UU}=TA+TA_{offset}-\Delta_{DD}-T_g.$$

In a possible implementation, the first node may switch from a first upper-level node to a second upper-level node for some reason, for example, a beam failure. In this case, the first node transmits $T_{delta}1$ or $\Delta_{DD}$ to the second upper-level node, where $T_{delta}1=\Delta_{DD}-TA/2$. Before the first node completes reporting, the second upper-level node assumes $\Delta_{DD}=TA/2$.

In a possible implementation, the timing of the first node is not configured by the second node by using the OTA method. For example, the timing of the first node may be obtained by using a GPS. In this case, the first node transmits $T_{delta}1$ or $\Delta_{DD}$ to the second upper-level node, where $T_{delta}1=\Delta_{DD}-TA/2$. Before the first node completes reporting, the second upper-level node assumes $\Delta_{DD}=TA/2$.

In a possible implementation, $T_{delta}$ received by the JAB node and $T_{delta}1$ reported by the JAB node have the same signaling format, and the signaling format includes value ranges and value granularities of $T_{delta}$ and $T_{delta}1$.

In a possible implementation, during air interface synchronization, the upper-level node adjusts TA or $T_{delta}$ to adjust the downlink transmit timing of the DU of the first node, and the upper-level node may learn a time at which the first node completes the downlink transmit timing. Therefore, the upper-level node uses a new $\Delta_{DD}$ value by default after the first node completes the timing adjustment. Correspondingly, the first node receives a TA update command transmitted by the upper-level node, and the first node updates are and/or $\Delta_{DD}$ based on the TA update command.

In a possible implementation, the upper-level node reports values of $T_{delta}$ and/or $T_{delta}1$ to the donor base station node. Herein, $T_{delta}$ indicates a timing adjustment value that the upper-level node transmits or is ready to transmit to the first node. Optionally, after the reporting, the donor base station transfers an updated value of $T_{delta}$ to the upper-level node, and then the upper-level node transmits the updated value of $T_{delta}$ to the first node.

It should be understood that the TA update command may be transmitted to the first node by using RRC or a MAC CE, or may be transmitted by the donor node to the first node by using RRC or the F1-AP interface. In addition, if a value of $T_g$ of the first node is the same as a value of $T_g$ of the upper-level node, the first node may not report the value of $T_g$. In this case, $\Delta_{UU}=\Delta_{DD}$.

In a possible implementation, the upper-level node updates the downlink transmit timing for the DU of the first node. In this case, the DU of the first node needs to adjust a downlink transmit time to an updated value, and at the same time, the DU of the first node should also adjust an uplink receive timing to keep $T_g$ constant. Optionally, the first node does not adjust the downlink transmit timing of the DU in a process of transmitting a downlink slot. Optionally, the uplink receive timing of the DU is not adjusted in a process of receiving an uplink slot. Therefore, optionally, the foregoing adjustment may be performed in a CP range of a first symbol of the slot.

It should be understood that the foregoing calculation of $\Delta_{DD}$, $\Delta_{UD}$, $A_{UU}$, and $\Delta_{DU}$ is an example. After obtaining necessary information, the second node may obtain $\Delta_{DD}$, $\Delta_{UD}$, $\Delta_{UU}$, and $\Delta_{DU}$ by using different implementation methods. The necessary information includes at least one of TA, $T_{delta}$, $T_{delta}1$, $TA_{offset}$, and $T_g$.

An uplink timing advance TA from the first node to the second node is considered. In an initial access process, the first node obtains an initial timing advance from the second node, and then the second node may update the uplink timing advance of the first node by using signaling, and the first node communicates with the second node by using an updated uplink timing advance. However, in practice, decoding errors may occur on the first node and/or the second node, causing a difference between TA values maintained by the first node and the second node. When the TA values maintained by the first node and the second node are different, the second node may consequently configure incorrect $T_{delta}$ for the first node, or an error is caused when the second node calculates $\Delta_{DD}$, $\Delta_{UD}$, $A_{UU}$, and $\Delta_{DU}$. To avoid this case, a mechanism needs to be provided to resolve the inconsistency of the TA values maintained or stored by the first node and the second node.

In a possible implementation, to ensure that the second node can configure correct $T_{delta}$ for the first node, the first node reports a TA value maintained by the first node to the second node or the donor node, and the TA value is denoted as TA1. The reporting may be triggered by the second node or the donor node. For example, the second node or the donor node transmits a TA reporting request to the first node, and after receiving the TA reporting request, the first node reports, to the second node or the donor node, the TA value maintained by the first node. Optionally, the first node may also report $T_{delta}1$, and $T_{delta}1$ is obtained based on TA1, that is, $T_{delta}1=\Delta_{DD}-TA1/2$.

In a possible implementation, the first node reports, to the second node or the donor node, TA1/2 and $T_{delta}1$ corresponding to TA1/2. Alternatively, when reporting $T_{delta}1$, the first node may also report a TA value or TA/2 used by the first node for calculating $T_{delta}1$. Alternatively, when triggering the first node to report $T_{delta}1$, the second node or the donor node may also request the first node to report a TA value or TA/2 used for calculating $T_{delta}1$.

In another possible implementation, after receiving the MAC CE timing update command transmitted by the second node, the first node transmits a TA acknowledgment message to the second node by using a MAC CE, to ensure that the first node and the second node maintain the same TA. Because the first node needs to return the TA acknowledgment message in this case, the second node cannot apply the value of the timing advance in the timing update command before receiving the TA acknowledgment message. To ensure that the first node and the second node can use a correct timing advance at the same time, an activation time may be added to the timing update command. For example, from a perspective of the second node, the activation time may be a value of a new timing advance used starting from m slots/subframes after a current slot/subframe in which the timing update command is transmitted, where m is any positive integer. The activation time may alternatively be defined by the protocol. For example, the protocol specifies that a value of a new timing advance is used starting from m slots/subframes after a timing update command is received. A specific implementation is not limited in this application.

Because the TA acknowledgment message may also be lost, to ensure consistency, the second node may further transmit a TA update complete message to the first node. If the TA update complete message is supported, the foregoing activation time should be after a time of the TA update complete message.

According to the foregoing embodiment, it can be ensured that the upper-level node can configure a correct timing offset $T_{delta}$ for the JAB node, and it can be ensured that $\Delta_{DD}$, $\Delta_{UD}$, $\Delta_{UU}$, and $\Delta_{DU}$ obtained through calculation by the second node are consistent with a calculation result of the first node, so that an availability status of a symbol is correctly determined and that a data transmission error caused by symbol inconsistency is avoided.

It should be noted that the foregoing embodiment provides some examples in which the second node obtains a time offset between a symbol on the MT and a symbol on the DU based on $\Delta_{DD}$, $\Delta_{UD}$, $D_{UU}$, and $\Delta_{DU}$. In practice, the second node may obtain a time offset between any symbol on the MT and any symbol on the DU based on $\Delta_{DD}$, $\Delta_{UD}$, $\Delta_{UU}$, and $\Delta_{DU}$, and parameter information of the resources on the MT and the DU of the JAB node. A specific obtaining or calculation method may be defined by the protocol, or may be left for implementation of the second node.

An availability status of a symbol in the first resource set may be determined according to the foregoing embodiment, so that symbol utilization is maximized and that spectral efficiency is improved. It should be understood that determining an availability status of every symbol is not required for determining an availability status of a symbol in the first resource set. Generally, first one or more symbols or last one or more symbols in the first resource set may be considered. For example, only symbols 0 to 3 in the first resource set are considered, and the last symbols may be symbols k−1, k−2, k−3, and the like. After the first and last available symbols are determined, a status of any symbol between the first and last available symbols is available.

In the foregoing embodiment, a status of an available symbol in the first resource set after the first hard resource and/or before the second hard resource on the DU of the JAB node is mainly determined. The first resource set may be only a part of resources between the first hard resource and the second hard resource. For ease of description, the resources between the first hard resource and the second hard resource are referred to as available resources of the MT in this application. The available resources of the MT may include a plurality of first resource sets. Each first resource set may be scheduled for uplink transmission or downlink transmission. If transmission statuses of two consecutive first resource sets are different, that is, if one first resource set is used for uplink transmission, and the other first resource set is used for downlink transmission, a power amplifier receive/transmit transition between the two first resource sets is also required.

FIG. 12(*a*) and FIG. 12(*b*) are a schematic diagram of different transmission statuses of two consecutive first resource sets on the MT of the JAB node. In FIG. 12(*a*), the MT of the IAB node transitions from transmission to reception. In FIG. 12(*b*), the MT of the IAB node transitions from reception to transmission.

In FIG. 12(*a*), 1201 is a downlink transmit resource on the DU of the IAB node, and 1202 is an uplink receive resource on the DU of the IAB node. 1203 is a downlink transmit slot timing of the DU of the IAB node, and 1204 is an uplink receive timing of the DU of the IAB node. 1205 is a receive resource (or resource set) on the MT of the IAB node, and 1206 is a transmit resource (or resource set) on the MT of the IAB node. In FIG. 12(*a*), the MT of the IAB node transitions from uplink transmission to downlink reception.

It can be learned from the foregoing embodiment that a time difference $\Delta_{UD}^{MT}=TA+T_{offset}-\Delta_{DD}$ between a start time of the resource 1205 and an end time of the resource 1206 is obtained. In $\Delta_{UD}^{MT}$, a superscript represents the MT, and a subscript represents from uplink transmission to downlink reception. Meanings of other parameters are described above, and details are not described again.

Therefore, when $\Delta_{UD}^{MT} \geq T_{TR}$ (or $\Delta_{UD}^{MT} > T_{TR}$), the resource 1206 is available. It should be understood that, it is assumed herein that a power amplifier transmit-receive transition time on the MT of the IAB node is equal to a transition time on the DU. Otherwise, $T_{TR}$ should be the power amplifier transmit-receive transition time on the MT.

When data is transmitted or received on the MT, control information is usually carried in downlink reception. Therefore, it is usually necessary to ensure that a first symbol in downlink transmission is available. In the embodiment shown in FIG. 12(*a*) and FIG. 12(*b*), it is assumed that availability of the first symbol in downlink reception is ensured. If $\Delta_{UD}^{MT} < T_{TR}$ (or $\Delta_{UD}^{MT} \leq T_{TR}$), a quantity i of symbols that need to be punctured on the resource 1206 needs to satisfy $i*T_s+\Delta_{UD}^{MT} \geq T_{TR}$ (or $i*T_s+\Delta_{UD}^{MT} > T_{TR}$).

In FIG. 12(*b*), the MT of the IAB node first performs downlink reception on a resource 1215, and then performs uplink transmission on another resource 1216. 1211 is a downlink transmit resource on the DU of the IAB node, and 1212 is an uplink receive resource on the DU of the IAB node. 1213 is a downlink transmit slot timing of the DU of the IAB node, and 1214 is an uplink receive timing of the DU of the IAB node.

Similarly, a time difference between a start time of uplink transmission and an end time of downlink reception by the MT of the IAB node is $\Delta_{UD}^{MT}=\Delta_{DD}+T_g$. In $\Delta_{UD}^{MT}$, a superscript represents the MT, and a subscript represents from downlink reception to uplink transmission. Meanings of other parameters are described above, and details are not described again.

It can be learned from FIG. 12(*b*) that because an overlap time between a last resource of 1215 and a first resource of 1216 is $\Delta_{UD}^{MT}$, to ensure that a requirement for a power amplifier transition between the two resource sets is satisfied, last one or more symbols in the resource set 1215 need to be punctured. Alternatively, one or more symbols starting from the resource set 1216 are punctured. Alternatively, one or more symbols at the end of 1215 or at the beginning of 1216 are separately punctured, to ensure that a time requirement for a power amplifier transition between the two resource sets is satisfied.

Specifically, the quantity i of symbols to be punctured needs to satisfy $i*T_s-\Delta_{UD}^{MT} \geq T_{RT}$ (or $i*T_s-\Delta_{UD}^{MT} > T_{RT}$). Therefore, a total quantity of symbols punctured in the resource set 1215 and/or the resource set 1216 only needs to satisfy the foregoing requirement. Specifically, whether a symbol at the end of the resource set 1215 or a symbol at the beginning of the resource set 1216 is punctured, or some symbols in 1215 and 1216 are separately punctured, may depend on a configuration. For example, there may be an indication in the DCI of the PDCCH. Specifically, the indication may include the quantity of symbols to be punctured, and may further include an indication that only a tail of downlink reception is punctured or only a head of uplink transmission is punctured, for example, a 1-bit indication, where 1 indicates that only the tail of downlink reception is punctured, and 0 indicates that only the head of uplink transmission is punctured.

If the transmission directions of two consecutive first resource sets in the available resources of the MT are the same, there is no power amplifier transition time. Therefore, symbols between the two resource sets do not need to be punctured.

In a possible implementation, the last symbol in the first hard resource set or the first symbol in the second hard resource set is a flexible symbol, that is, a symbol whose transmission direction is not determined. In a possible implementation, the second node may separately assume that the flexible symbol is an uplink symbol or a downlink symbol, and separately determine the availability of the symbol based on the two assumptions. The symbol is determined as an available symbol only when the symbol is an available symbol in both of the assumptions. In another possible implementation, the protocol specifies an assumption of the flexible symbol by the second node. For example, the flexible symbol is always assumed to be an uplink symbol or a downlink symbol, and the second node determines the availability of the symbol based on the assumption. According to the foregoing embodiment, when the transmission directions of two consecutive first resource sets in the available resources of the MT are controlled to be different, the quantity of symbols to be punctured may be determined. Symbol-level control reduces resource waste, improves spectral efficiency, and ensures consistency of reception or transmission between a transmit end and a receive end, thereby avoiding a transmission error.

In the foregoing embodiment, the availability of symbols in the first resource set is mainly determined based on a known configuration of the first hard resource set and/or the second hard resource set. However, in some cases, there may be an opposite possibility that the configuration of the first hard resource set and/or the second hard resource set is an implicit configuration. The implicit configuration means that an available resource between the first hard resource set and the second hard resource set is specified by signaling and that a position of an end symbol of the first hard resource set or a position of a start symbol of the second hard resource set is inferred reversely.

Specifically, the JAB node receives configuration information of available resources of the MT that is transmitted by the upper-level node or the donor node. The JAB node determines, based on the configuration information of the available resources of the MT, a position of a last available symbol in the first hard resource set in the foregoing scenarios; or the JAB node determines a position of a first available symbol in the second hard resource set in the foregoing scenarios based on the configuration information of the available resources of the MT.

Specifically, the last symbol in the first hard resource set and/or the symbol in the second hard resource set may be determined based on the transmission direction of the first resource in the available resources of the MT and the transmission direction of the first hard resource set or the second hard resource set. For example, the first resource set is used for downlink reception and the first hard resource set is used for downlink transmission. When a time difference between a start time $t_3$ of a first available symbol in the first resource set and an end time $t_1$ of any symbol in the first hard resource set satisfies $t_3-t_1 \geq T_{TR}$ (or $t_3-t_1 > T_{TR}$), the last symbol in the first hard resource set has a latest symbol end time $t_1$ satisfying the foregoing condition. Meanings of other parameters are described above, and details are not described again.

Similarly, a position of the first symbol in the second hard resource set may be determined.

It should be understood that the foregoing implicit derivation requires that the upper-level node or the donor node should obtain information of $\Delta_{DD}$, $\Delta_{UD}$, $\Delta_{UU}$, and $\Delta_{DU}$. A method for obtaining $\Delta_{DD}$, $\Delta_{UD}$, $\Delta_{UU}$, and $\Delta_{DU}$ is similar to step S907, and details are not described herein again.

Assuming that there are j unavailable symbols or soft symbols after the last symbol in the first hard resource set, a value of j may be determined based on $j*T_s+\Delta_{DD}\geq x$ (or $j*T_s+\Delta_{DD}>x$). Meanings of other parameters are described above, and details are not described again. A boundary of the first hard resource set may be determined by determining the parameter j.

Similarly, it is determined that there are j unavailable symbols or soft symbols before the second hard resource set, and a value of j is determined based on $j*T_s-\Delta_{DD}\geq x$ (or $j*T_s-\Delta_{DD}>x$). A boundary of the second hard resource set may be determined by determining the parameter j.

Likewise, when the first hard resource set is used for uplink reception and the first resource set is used for downlink reception, symbols in the first hard resource set are all available, because in this case, no power amplifier transition is required on the JAB node. In this case, symbols between the first resource set and the first hard resource set are all available. Therefore, a symbol boundary of the first hard resource set is a symbol before the first symbol in the first resource set.

When the second hard resource set is used for uplink reception and the first resource set is used for downlink reception, a value of a quantity j of unavailable symbols or soft symbols before the second hard resource set is determined based on $j*T_s-\Delta_{DU}\geq y$ (or $j*T_s-\Delta_{DU}>$). A boundary of the second hard resource set may be determined by determining the parameter j.

When the first hard resource set is used for downlink transmission and the first resource set is used for uplink transmission, a value of a quantity j of unavailable symbols or soft symbols after the first hard resource set is determined based on $j*T_s-\Delta_{UD}\geq x$ (or $j*T_s-\Delta_{UD}>x$). A boundary of the first hard resource set may be determined by determining the parameter j.

When the second hard resource set is used for downlink transmission, and the first resource set is used for uplink transmission, no power amplifier transition is required in this case. Therefore, symbols in the second hard resource set are all available. Therefore, a boundary of the first symbol in the second hard resource set is a symbol after the first resource set.

When the first hard resource set is used for uplink reception and the first resource set is used for uplink transmission, a value of a quantity j of unavailable symbols or soft symbols after the first hard resource set is determined based on $j*T_s-\Delta_{UU}+T_g\geq x$ (or $j*T_s-\Delta_{UD}+T_g>x$). A boundary of the first hard resource set may be determined by determining the parameter j.

When the second hard resource set is used for uplink reception and the first resource set is used for uplink transmission, a value of a quantity j of unavailable symbols or soft symbols before the second hard resource set is determined based on $j*T_s-\Delta_{UU}+T_g\geq y$ (or $j*T_s-\Delta_{UD}+T_g>y$). A boundary of the second hard resource set may be determined by determining the parameter j.

According to the foregoing embodiment, when the first resource set is configured in an implicit manner, the quantity of unavailable symbols in the first hard resource set and/or the second hard resource set may be determined.

The solutions provided in the embodiments of this application are mainly described above from a perspective of interaction between network elements. It may be understood that, to implement the foregoing functions, each network element, for example, the first node and the second node, includes a corresponding hardware structure and/or software module for performing each function. A person skilled in the art should easily be aware that, in combination with the examples described in the embodiments disclosed in this specification, network elements and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first node and the second node may be divided into functional modules based on the foregoing method example. For example, the first node and the second node may be divided into functional modules, or two or more functions may be integrated into one processing module. The integrated module may be implemented in a form of hardware, or may be implemented in a form of a software functional module. It should be noted that, in the embodiments of this application, module division is an example, and is merely a logical function division. In an actual implementation, another division manner may be used. It should be understood that the second node may be an JAB node or a donor base station.

Figure 13:
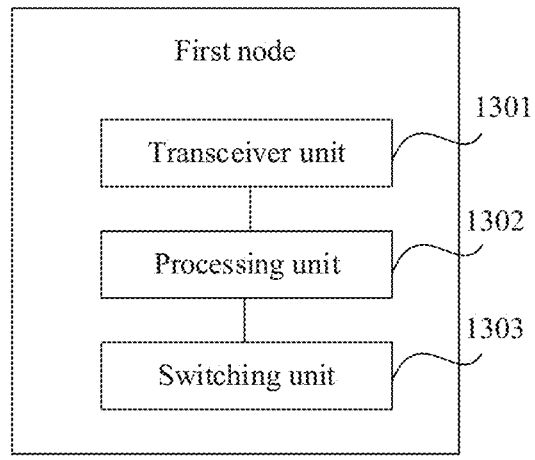
FIG. 13 shows a possible schematic structural diagram of a first node according to an embodiment of this application.

FIG. 13 is a possible schematic structural diagram of a first node according to the foregoing embodiment of this application. In this application, the first node is an IAB node. The first node includes a transceiver unit 1301 and a processing unit 1302. The transceiver unit 1301 is configured to support the first node in performing S903 and S908 in FIG. 9, and is configured to support the first node in transmitting $T_{delta}1$ or $\Delta_{DD}$ to the second upper-level node when switching from the first upper-level node to the second upper-level node in the foregoing embodiment. The processing unit 1302 is configured to support the first node in performing S904 and S905 in FIG. 9, and is configured to support the first node in processing the received message or signaling in the foregoing embodiment.

The first node further includes: a switching unit 1303, configured to support the first node in switching from the first upper-level node to the second upper-level node.

In a hardware implementation, the transceiver unit 1101 may be a transceiver, and the transceiver constitutes a communications interface of the first node. It should be understood that the communications interface may be a software interface or a hardware interface.

Figure 14:
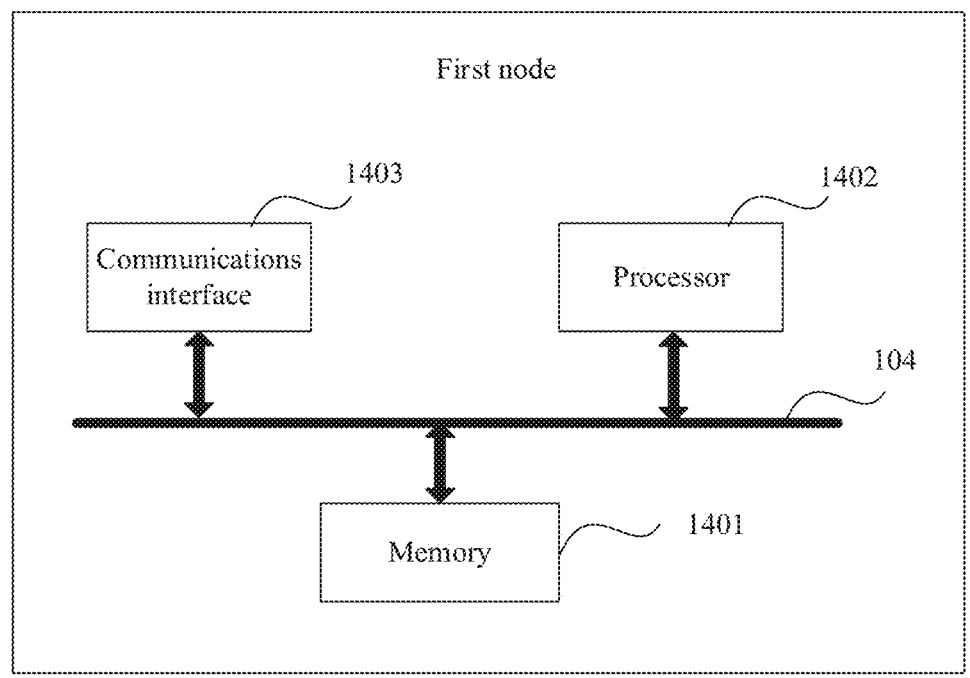
FIG. 14 shows a possible schematic logical structural diagram of a first node according to an embodiment of this application.

FIG. 14 is a possible schematic logical structural diagram of a first node according to the foregoing embodiment of this application. The first node includes a processor 1402. In this embodiment of this application, the processor 1402 is configured to control and manage an action of the first node. For example, the processor 1402 is configured to support the first node in performing S904 and S905 in FIG. 9 in the foregoing embodiment, and configured to support the first node in processing the received message or signaling in the foregoing embodiment. Optionally, the first node may further include a memory 1401 and a communications interface 1403. The processor 1402, the communications interface 1403, and the memory 1401 may be connected to each other, or may be connected to each other by using a bus 1404. The communications interface 1403 is configured to support the first node in performing communication. The memory 1401 is configured to store program code and data of the first node. The processor 1402 invokes the code stored in the memory 1401 to perform control and management, to implement various possible methods in the foregoing embodiments. The memory 1401 may be coupled to the processor, or may not be coupled to the processor.

Alternatively, the processor 1402 and the memory 1401 may be integrated into an application-specific integrated circuit, and the application-specific integrated circuit may further include a communications interface 1403. The application-specific integrated circuit may be a processing chip or a processing circuit. The communications interface 1403 may be a communications interface for radio reception and transmission, or may be an interface for inputting a digital signal after another processing circuit processes a received radio signal, or may be a software or hardware interface for communicating with another module.

In a possible design, the processor 1402, the memory 1401, and the communications interface 1403 may be implemented by using a chip. The processor 1402, the memory 1401, and the communications interface 1403 may be implemented in one chip, or may be separately implemented in different chips, or any two functions are implemented in one chip.

The processor 1402 may be a central processing unit, a general-purpose processor, a digital signal processor, an application-specific integrated circuit, a field programmable gate array or another programmable logical device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 1404 may be a peripheral component interconnect (PCI) bus, an extended industry standard architecture (EISA) bus, or the like. The bus may be classified into an address bus, a data bus, a control bus, and the like.

Alternatively, the processor 1402, the communications interface 1403, and the memory 1401 may be integrated into one integrated circuit, and perform all actions or functions performed by the first node in the foregoing embodiment.

Figure 15:
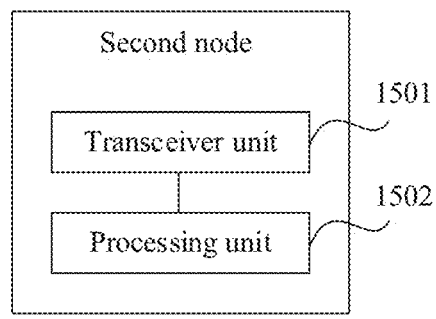
FIG. 15 shows a possible schematic structural diagram of a second node according to an embodiment of this application.

FIG. 15 is a possible schematic structural diagram of a second node according to the foregoing embodiment of this application. In this application, the second node is a relay node or a donor base station. The second node includes a transceiver unit 1501 and a processing unit 1502. The transceiver unit 1501 is configured to support the second node in performing S903 and S908 in FIG. 9, and is configured to support the second node in receiving $T_{delta}1$ or $\Delta_{DD}$ when the first node switches to the second node in the foregoing embodiment. The processing unit 1502 is configured to support the second node in performing S901, S902, S906, and S907 in FIG. 9, or is configured to process a received message.

In a hardware implementation, the transceiver unit 1501 may be a transceiver, and the transceiver constitutes a communications interface of the second node. It should be understood that the communications interface may be a software interface or a hardware interface.

Figure 16:
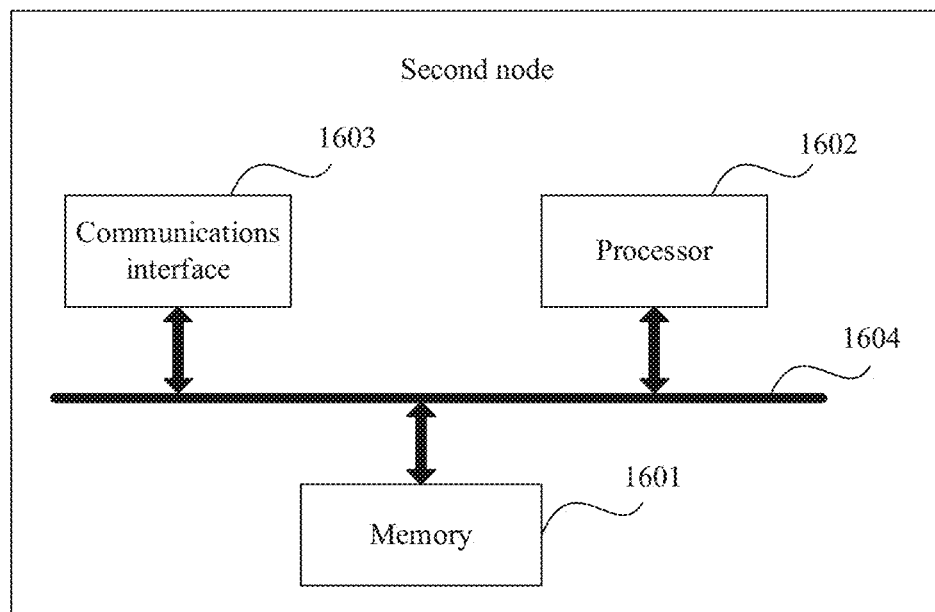
FIG. 16 shows a possible schematic logical structural diagram of a second node according to an embodiment of this application.

FIG. 16 is a possible schematic logical structural diagram of a second node according to the foregoing embodiment of this application. The second node includes a processor 1602. In this embodiment of this application, the processor 1602 is configured to control and manage an action of the second node. For example, the processor 1602 is configured to support the second node in performing S901, S902, S906, and S907 in FIG. 9 in the foregoing embodiment, or is configured to process a received message. Optionally, the second node may further include a memory 1601 and a communications interface 1603. The processor 1602, the communications interface 1603, and the memory 1601 may be connected to each other, or may be connected to each other by using a bus 1604. The communications interface 1603 is configured to support the second node in performing communication. The memory 1601 is configured to store program code and data of the second node. The processor 1602 invokes the code stored in the memory 1601 to perform control and management. The memory 1601 may be coupled to the processor, or may not be coupled to the processor.

Alternatively, the processor 1602 and the memory 1601 may be integrated into an application-specific integrated circuit, and the application-specific integrated circuit may further include a communications interface 1603. The application-specific integrated circuit may be a processing chip or a processing circuit. The communications interface 1603 may be a communications interface including a radio transceiver, or may be an interface for inputting a digital signal after another processing circuit processes a received radio signal, or may be a software or hardware interface for communicating with another module.

In a possible design, the processor 1602, the memory 1601, and the communications interface 1603 may be implemented by using a chip. The processor 1602, the memory 1601, and the communications interface 1603 may be implemented in one chip, or may be separately implemented in different chips, or any two functions are implemented in one chip.

The processor 1602 may be a central processing unit, a general-purpose processor, a digital signal processor, an application-specific integrated circuit, a field programmable gate array or another programmable logical device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 1604 may be a peripheral component interconnect (PCI) bus, an extended industry standard architecture (EISA) bus, or the like. The bus may be classified into an address bus, a data bus, a control bus, and the like.

Alternatively, the processor 1602, the communications interface 1603, and the memory 1601 may be integrated into one integrated circuit, and perform all actions or functions performed by the second node in the foregoing embodiment.

In another embodiment of this application, a readable storage medium is further provided. The readable storage medium stores a computer-executable instruction. When a device (which may be a single-chip microcomputer, a chip, or the like) or a processor performs the method for determining a resource in FIG. 9, the computer-executable instruction in the storage medium is read. The foregoing readable storage medium may include: any medium that can store program code, such as a removable hard disk, a read-only memory, a random access memory, a magnetic disk, or an optical disc.

In another embodiment of this application, a computer program product is further provided. The computer program product includes a computer-executable instruction, and the computer-executable instruction is stored in a computer-readable storage medium. At least one processor of a device may read the computer-executable instruction from the computer-readable storage medium, and the at least one processor executes the computer-executable instruction, so that the device performs steps performed by the first node or the second node in the method for determining a resource in FIG. 9.

In another embodiment of this application, a communications system is further provided. The communications system includes at least a first node and a second node. The first node may be the first node provided in FIG. 9, and is configured to perform steps performed by the first node in the method for determining a resource provided in FIG. 9; and/or the second node may be the second node provided in FIG. 9, and is configured to perform steps performed by the second node in the method for determining a resource provided in FIG. 9. It should be understood that the communications system may include a plurality of first nodes and second nodes, or may include a plurality of first nodes and one second node. Resource indication information is used to enable the first node and the second node to determine an availability status of a resource on a backhaul link, and symbol-level resource determining avoids resource waste and improves spectral efficiency.

In this embodiment of this application, a resource is determined, so that consistency of a determined resource status is maintained between the first node and the second node and that communication is performed based on the determined resource. Because the determined resource is based on a symbol resource, air interface resource utilization is maximized, resource waste is reduced, and spectral efficiency is improved.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An apparatus, wherein the apparatus is applied to a first node and configured to determine a resource in a relay system and comprises:
a transceiver, configured to receive resource indication information transmitted by an upper-level node, wherein the resource indication information indicates a transmission direction of a first resource set, the first resource set is located between a first hard resource set and a second hard resource set, and the first hard resource set and the second hard resource set are consecutive hard resources; and
a processor, configured to determine a first threshold x and a second threshold y based on the resource indication information, wherein
when $t_3-t_1 \geq x$, and $t_2-t_4 \geq y$, the processor is further configured to determine that a symbol in the first resource set is available, wherein
$t_1$ is an end time of a last symbol in the first hard resource set, $t_2$ is a start time of a first symbol in the second hard resource set, $t_3$ is a start time of the symbol in the first resource set, and $t_4$ is an end time of the symbol in the first resource set; and
the transceiver is further configured to communicate with the upper-level node on the symbol in the first resource set based on the resource indication information.

2. The apparatus according to claim 1, wherein the processor is configured to:
when a transmission direction of the last symbol in the first hard resource set is downlink transmission, and the transmission direction of the first resource set is downlink transmission, determine the first threshold $x=T_{TR}$; or
when a transmission direction of the last symbol in the first hard resource set is downlink transmission, and the transmission direction of the first resource set is uplink transmission, determine $x=0$; or
when a transmission direction of the last symbol in the first hard resource set is uplink transmission, and the transmission direction of the first resource set is downlink transmission, determine $x=0$; or
when a transmission direction of the last symbol in the first hard resource set is uplink transmission, and the transmission direction of the first resource set is uplink transmission, determine $x=T_{RT}$; or
when a transmission direction of the first symbol in the second hard resource set is downlink transmission, and the transmission direction of the first resource set is downlink transmission, determine $y=T_{RT}$; or
when a transmission direction of the first symbol in the second hard resource set is downlink transmission, and the transmission direction of the first resource set is uplink transmission, determine $y=0$; or
when a transmission direction of the first symbol in the second hard resource set is uplink transmission, and the transmission direction of the first resource set is downlink transmission, determine $y=0$; or
when a transmission direction of the first symbol in the second hard resource set is uplink transmission, and the transmission direction of the first resource set is uplink transmission, determine $y=T_{TR}$, wherein
$T_{RT}$ is a receive-transmit transition time of the first node, and $T_{TR}$ is a transmit-receive transition time of the first node.

3. The apparatus according to claim 1, wherein
when the transmission direction of the last symbol in the first hard resource set is downlink transmission, and the transmission direction of the first resource set is downlink transmission, $t_3-t_1$ and $t_2-t_4$ are determined by $\Delta_{DD}$, wherein $$\Delta_{DD} = \frac{TA}{2} + T_{delta};$$

or
when the transmission direction of the last symbol in the first hard resource set is downlink transmission, and the transmission direction of the first resource set is uplink transmission, $t_3-t_1$ and $t_2-t_4$ are determined by $\Delta_{UD}$, wherein $\Delta_{UD}=TA+TA_{offset}-\Delta_{DD}$; or
when the transmission direction of the last symbol in the first hard resource set is uplink transmission, and the transmission direction of the first resource set is downlink transmission, $t_3-t_1$ and $t_2-t_4$ are determined by $\Delta_{DU}$, wherein $\Delta_{DU}=T_g+\Delta_{DD}$; or
when the transmission direction of the last symbol in the first hard resource set is uplink transmission, and the transmission direction of the first resource set is uplink transmission, $t_3-t_1$ and $t_2-t_4$ are determined by $\Delta_{UU}$, wherein $\Delta_{UU}=TA+TA_{offset}-\Delta_{DD}-T_g$; or when the transmission direction of the first symbol in the second hard resource set is downlink transmission, and the transmission direction of the first resource set is downlink transmission, $t_3-t_1$ and $t_2-t_4$ are determined by $\Delta_{DD}$, wherein $$\Delta_{DD} = \frac{TA}{2} + T_{delta};$$

or
when the transmission direction of the first symbol in the second hard resource set is downlink transmission, and the transmission direction of the first resource set is uplink transmission, $t_3-t_1$ and $t_2-t_4$ are determined by $\Delta_{UD}$, wherein $\Delta_{UD}$ $TA+TA_{offset}-\Delta_{DD}$; or
when the transmission direction of the first symbol in the second hard resource set is uplink transmission, and the transmission direction of the first resource set is downlink transmission, $t_3-t_1$ and $t_2-t_4$ are determined by $\Delta_{DU}$, wherein $\Delta_{DU}=T_g+\Delta_{DD}$; or
when the transmission direction of the first symbol in the second hard resource set is uplink transmission, and the transmission direction of the first resource set is uplink transmission, $t_3-t_1$ and $t_2-t_4$ are determined by $\Delta_{UU}$, wherein $\Delta_{UU}=TA+TA_{offset}-\Delta_{DD}-T_g$, wherein
TA is a timing advance, $T_{delta}$ is a timing offset, $TA_{offset}$ is a timing advance offset, and $T_g$ is a receive/transmit transition time difference of an access link of the first node.

4. The apparatus according to claim 3 wherein
the processor is further configured to switch from a first upper-level node to a second upper-level node, wherein
the transceiver is further configured to transmit $T_{delta}$ or $\Delta_{DD}$ to the second upper-level node.

5. The apparatus according to claim 3, wherein the transceiver is further configured to report $\Delta_{UU}$, or $$\Delta_{UU} - \frac{TA}{2},$$

or $T_g$ to the upper-level node.

6. The apparatus according to claim 3, wherein the transceiver is further configured to receive a TA update command transmitted by the upper-level node, so that the first node updates $\Delta_{UU}$ based on the TA update command.

7. An apparatus, wherein the apparatus is applied to a second node and configured to determine a resource in a relay system and comprises:
a processor, configured to obtain a first hard resource set and a second hard resource set of a first node, wherein the first hard resource set and the second hard resource set are consecutive hard resources, and the second node is an upper-level node of the first node, wherein
the processor is further configured to determine a first resource set, wherein the first resource set is located between the first hard resource set and the second hard resource set;
the processor is further configured to obtain a first threshold x and a second threshold y; and
when a time difference $D_h$ between a start time of a symbol in the first resource set and an end time of a last symbol in the first hard resource set is greater than x, and a time difference $D_e$ between a start time of a first symbol in the second hard resource set and an end time of the symbol in the first resource set is greater than y, the processor is further configured to determine that the symbol in the first resource set is available; and
a transceiver, configured to perform data transmission with the first node using the symbol in the first resource set.

8. The apparatus according to claim 7, wherein the processor is configured to:
when a transmission direction of the last symbol in the first hard resource set is downlink transmission, and a transmission direction of the first resource set is downlink transmission, determine the first threshold $x=T_{TR}$; or
when a transmission direction of the last symbol in the first hard resource set is downlink transmission, and a transmission direction of the first resource set is uplink transmission, determine x=0; or
when a transmission direction of the last symbol in the first hard resource set is uplink transmission, and a transmission direction of the first resource set is downlink transmission, determine x=0; or
when a transmission direction of the last symbol in the first hard resource set is uplink transmission, and a transmission direction of the first resource set is uplink transmission, determine $x=T_{RT}$; or
when a transmission direction of the first symbol in the second hard resource set is downlink transmission, and a transmission direction of the first resource set is downlink transmission, determine $y=T_{RT}$; or
when a transmission direction of the first symbol in the second hard resource set is downlink transmission, and a transmission direction of the first resource set is uplink transmission, determine y=0; or
when a transmission direction of the first symbol in the second hard resource set is uplink transmission, and a transmission direction of the first resource set is downlink transmission, determine y=0; or
when a transmission direction of the first symbol in the second hard resource set is uplink transmission, and a transmission direction of the first resource set is uplink transmission, determine $y=T_{TR}$, wherein
$T_{RT}$ is a receive-transmit transition time of the first node, and $T_{TR}$ is a transmit-receive transition time of the first node.

9. The apparatus according to claim 7, wherein the transceiver is further configured to transmit resource indication information to the first node, wherein the resource indication information indicates the transmission direction of the first resource set.

10. The apparatus according to claim 7, wherein the transceiver is further configured receive $\Delta_{UU}$, or $$\Delta_{UU} - \frac{TA}{2},$$

or $T_g$ reported by the first node, wherein TA is a timing advance, $\Delta_{UU}$ is a time difference between an uplink transmit frame of a backhaul link of the first node and a boundary of an uplink receive frame of an access link of the first node, and $T_g$ is a receive/transmit transition time difference of the access link of the first node.

11. The apparatus according to claim 7, wherein when the transmission direction of the last symbol in the first hard resource set is downlink transmission, and the transmission direction of the first resource set is downlink transmission, $D_h$ and $D_e$ are determined by $\Delta_{DD}$, wherein $$\Delta_{DD} = \frac{TA}{2} + T_{delta};$$

or
- when the transmission direction of the last symbol in the first hard resource set is downlink transmission, and the transmission direction of the first resource set is uplink transmission, $D_h$ and $D_e$ are determined by $\Delta_{UD}$, wherein $\Delta_{UD}=TA+TA_{offset}-\Delta_{DD}$; or
- when the transmission direction of the last symbol in the first hard resource set is uplink transmission, and the transmission direction of the first resource set is downlink transmission, $D_h$ and $D_e$ are determined by $\Delta_{DU}$, wherein $\Delta_{DU}=T_g+\Delta_{DD}$; or
- when the transmission direction of the last symbol in the first hard resource set is uplink transmission, and the transmission direction of the first resource set is uplink transmission, $D_h$ and $D_e$ are determined by $\Delta_{UU}$, wherein $\Delta_{UU}=TA+TA_{offset}-\Delta_{DD}-T_g$; or
- when the transmission direction of the first symbol in the second hard resource set is downlink transmission, and the transmission direction of the first resource set is downlink transmission, $D_h$ and $D_e$ are determined by $\Delta_{DD}$; or
- when the transmission direction of the first symbol in the second hard resource set is downlink transmission, and the transmission direction of the first resource set is uplink transmission, $D_h$ and $D_e$ are determined by $\Delta_{UD}$; or
- when the transmission direction of the first symbol in the second hard resource set is uplink transmission, and the transmission direction of the first resource set is downlink transmission, $D_h$ and $D_e$ are determined by $\Delta_{DU}$; or
- when the transmission direction of the first symbol in the second hard resource set is uplink transmission, and the transmission direction of the first resource set is uplink transmission, $D_h$ and $D_e$ are determined by $\Delta_{UU}$, wherein TA is the timing advance, $T_{delta}$ is a timing offset, $TA_{offset}$ is a timing advance offset, and $T_g$ is the receive/transmit transition time difference of the access link of the first node.

12. The apparatus according to claim 7, wherein the transceiver is further configured to transmit a TA update command to the first node, wherein the TA update command is used by the first node to update $\Delta_{DD}$, $\Delta_{UU}$, $\Delta_{UD}$, or $\Delta_{DU}$.

13. A method for determining a resource in a relay system, comprising:
- receiving, by a first node, resource indication information transmitted by an upper-level node, wherein the resource indication information indicates a transmission direction of a first resource set, the first resource set is located between a first hard resource set and a second hard resource set, and the first hard resource set and the second hard resource set are consecutive hard resources;
- determining, by the first node, a first threshold x and a second threshold y based on the resource indication information;
- when $t_3-t_1 \geq x$, and $t_2-t_4 \geq y$, determining, by the first node, that a symbol in the first resource set is available, wherein
$t_1$ is an end time of a last symbol in the first hard resource set, $t_2$ is a start time of a first symbol in the second hard resource set, $t_3$ is a start time of the symbol in the first resource set, and $t_4$ is an end time of the symbol in the first resource set; and
- communicating, by the first node, with the upper-level node using the symbol in the first resource set based on the resource indication information.

14. The method according to claim 13, wherein the determining, by the first node, a first threshold x and a second threshold y based on the resource indication information comprises:
- when a transmission direction of the last symbol in the first hard resource set is downlink transmission, and the transmission direction of the first resource set is downlink transmission, the first threshold $x=T_{TR}$; or
- when a transmission direction of the last symbol in the first hard resource set is downlink transmission, and the transmission direction of the first resource set is uplink transmission, $x=0$; or
- when a transmission direction of the last symbol in the first hard resource set is uplink transmission, and the transmission direction of the first resource set is downlink transmission, $x=0$; or
- when a transmission direction of the last symbol in the first hard resource set is uplink transmission, and the transmission direction of the first resource set is uplink transmission, $x=T_{RT}$; or
- when a transmission direction of the first symbol in the second hard resource set is downlink transmission, and the transmission direction of the first resource set is downlink transmission, $y=T_{RT}$; or
- when a transmission direction of the first symbol in the second hard resource set is downlink transmission, and the transmission direction of the first resource set is uplink transmission, $y=0$; or
- when a transmission direction of the first symbol in the second hard resource set is uplink transmission, and the transmission direction of the first resource set is downlink transmission, $y=0$; or
- when a transmission direction of the first symbol in the second hard resource set is uplink transmission, and the transmission direction of the first resource set is uplink transmission, $y=T_{TR}$, wherein
$T_{RT}$ is a receive-transmit transition time of the first node, and $T_{TR}$ is a transmit-receive transition time of the first node.

15. The method according to claim 13, wherein
when the transmission direction of the last symbol in the first hard resource set is downlink transmission, and the transmission direction of the first resource set is downlink transmission, $t_3-t_1$ and $t_2-t_4$ are determined by $\Delta_{DD}$, wherein $$\Delta_{DD} = \frac{TA}{2} + T_{delta};$$

or
- when the transmission direction of the last symbol in the first hard resource set is downlink transmission, and the transmission direction of the first resource set is uplink transmission, $t_3-t_1$ and $t_2-t_4$ are determined by $\Delta_{UD}$, wherein $\Delta_{UD}=TA+TA_{offset}-\Delta_{DD}$; or
- when the transmission direction of the last symbol in the first hard resource set is uplink transmission, and the transmission direction of the first resource set is downlink transmission, $t_3-t_1$ and $t_2-t_4$ are determined by $\Delta_{DU}$, wherein $\Delta_{DU}=T_g+\Delta_{DD}$; or when the transmission direction of the last symbol in the first hard resource set is uplink transmission, and the transmission direction of the first resource set is uplink transmission, $t_3-t_1$ and $t_2-t_4$ are determined by $\Delta_{UU}$, wherein $\Delta_{UU}=TA+TA_{offset}-\Delta_{DD}-T_g$; or when the transmission direction of the first symbol in the second hard resource set is downlink transmission, and the transmission direction of the first resource set is downlink transmission, $t_3-t_1$ and $t_2-t_4$ are determined by $\Delta_{DD}$, wherein $$\Delta_{DD} = \frac{TA}{2} + T_{delta};$$

or when the transmission direction of the first symbol in the second hard resource set is downlink transmission, and the transmission direction of the first resource set is uplink transmission, $t_3-t_1$ and $t_2-t_4$ are determined by $\Delta_{UD}$, wherein $\Delta_{UD}=TA+TA_{offset}-\Delta_{DD}$; or when the transmission direction of the first symbol in the second hard resource set is uplink transmission, and the transmission direction of the first resource set is downlink transmission, $t_3-t_1$ and $t_2-t_4$ are determined by $\Delta_{DU}$, wherein $\Delta_{DU}=T_g+\Delta_{DD}$; or when the transmission direction of the first symbol in the second hard resource set is uplink transmission, and the transmission direction of the first resource set is uplink transmission, $t_3-t_1$ and $t_2-t_4$ are determined by $\Delta_{UU}$, wherein $\Delta_{UU}=TA+TA_{offset}-\Delta_{DD}-T_g$, wherein TA is a timing advance, $T_{delta}$ is a timing offset, $TA_{offset}$ is a timing advance offset, and Ty is a receive-transmit time difference of an access link of the first node.

16. The method according to claim 15, further comprising:
switching, by the first node, from a first upper-level node to a second upper-level node; and
transmitting, by the first node, $T_{delta}$ or $\Delta_{DD}$ to the second upper-level node.

17. The method according to claim 15, further comprising:
reporting, by the first node, $\Delta_{UU}$, or $$\Delta_{UU} - \frac{TA}{2},$$

or $T_g$ to the upper-level node.

18. The method according to claim 15, further comprising:
receiving, by the first node, a TA update command transmitted by the upper-level node and updating $\Delta_{UU}$ based on the TA update command.

19. A method for determining a resource in a relay system, comprising:
obtaining, by a second node, a first hard resource set and a second hard resource set of a first node, wherein the first hard resource set and the second hard resource set are consecutive hard resources, and the second node is an upper-level node of the first node;
determining, by the second node, a first resource set, wherein the first resource set is located between the first hard resource set and the second hard resource set;
obtaining, by the second node, a first threshold x and a second threshold y;
when a time difference $D_h$ between a start time of a symbol in the first resource set and an end time of a last symbol in the first hard resource set is greater than x, and a time difference $D_e$ between a start time of a first symbol in the second hard resource set and an end time of the symbol in the first resource set is greater than y, determining, by the second node, that the symbol in the first resource set is available; and
performing, by the second node, data transmission with the first node on the symbol in the first resource set.

* * * * *

UNITED STATES PATENT AND TRADEMARK OFFICE
CERTIFICATE OF CORRECTION

PATENT NO. : 11,956,803 B2
APPLICATION NO. : 17/487440
DATED : April 9, 2024
INVENTOR(S) : Fengwei Liu et al.

It is certified that error appears in the above-identified patent and that said Letters Patent is hereby corrected as shown below:

In the Claims

In Column 45, Line 17, in Claim 3, delete "$\Delta_{UD}$ TA" and insert -- $\Delta_{UD}$=TA --.

In Column 47, Line 23, in Claim 11, delete "$A_{UU}$," and insert -- $\Delta_{UU}$, --.

In Column 49, Line 7, in Claim 15, delete "$A_{UU}$," and insert -- $\Delta_{UU}$, --.

In Column 49, Line 36, in Claim 15, delete "Ty" and insert -- $T_g$ --.

Signed and Sealed this
Eleventh Day of June, 2024

Katherine Kelly Vidal
*Director of the United States Patent and Trademark Office*